(12) United States Patent
Watson et al.

(10) Patent No.: US 7,722,854 B2
(45) Date of Patent: May 25, 2010

(54) STEAM REFORMING METHODS AND CATALYSTS

(75) Inventors: Junko M. Watson, Columbus, OH (US); Francis P. Daly, Delaware, OH (US); Yong Wang, Richland, WA (US); Anna Lee Tonkovich, Marysville, OH (US); Sean P. Fitzgerald, Columbus, OH (US); Steven T. Perry, Galloway, OH (US); Laura J. Silva, Dublin, OH (US); Rachid Taha, Dublin, OH (US); Enrique Aceves de Alba, Dublin, OH (US); Ya-Huei Chin, Richland, WA (US); Robert Rozmiarek, Richland, WA (US); XiaoHong Li, Richland, WA (US)

(73) Assignee: Velocy's, Plain City, OH (US)

( * ) Notice: Subject to any disclaimer, the term of this patent is extended or adjusted under 35 U.S.C. 154(b) by 1216 days.

(21) Appl. No.: 10/778,904

(22) Filed: Feb. 13, 2004

(65) Prior Publication Data
US 2004/0265225 A1 Dec. 30, 2004

Related U.S. Application Data

(60) Provisional application No. 60/482,351, filed on Jun. 25, 2003.

(51) Int. Cl.
C01B 3/26 (2006.01)

(52) U.S. Cl. .................. 423/652; 423/418.2; 423/437.1; 423/653; 423/654

(58) Field of Classification Search .................. 423/654, 423/653, 652, 418.2, 437.1
See application file for complete search history.

(56) References Cited

U.S. PATENT DOCUMENTS

| 4,511,673 | A | 4/1985 | Eto |
| 5,212,130 | A | 5/1993 | Addiego et al. |
| 5,268,346 | A | 12/1993 | Ino et al. |
| 5,366,719 | A | 11/1994 | van Wingerden et al. |
| 5,422,331 | A | 6/1995 | Galligan et al. |
| 5,510,056 | A | 4/1996 | Jacobs et al. |

(Continued)

FOREIGN PATENT DOCUMENTS

EP 0278749 A1 8/1988

(Continued)

OTHER PUBLICATIONS

Inui et al., "Catalytic combustion of natural gas as the role of on-site heat supply in rapid catalytic $CO_2$-$H_2O$ reforming of methane," Catalysis Today, pp. 295-302 (1995).

(Continued)

Primary Examiner—Wayne Langel
Assistant Examiner—James Fiorito
(74) Attorney, Agent, or Firm—Frank Rosenberg

(57) ABSTRACT

The present invention provides catalysts, reactors, and methods of steam reforming over a catalyst. Surprisingly superior results and properties obtained in methods and catalysts of the present invention are also described. For example, a coated catalyst was demonstrated to be highly stable under steam reforming conditions (high temperature and high pressure of steam). Methods of making steam reforming catalysts are also described.

28 Claims, 12 Drawing Sheets

U.S. PATENT DOCUMENTS

| | | | |
|---|---|---|---|
| 6,051,163 | A | 4/2000 | Kumberger et al. |
| 6,117,578 | A | 9/2000 | Lesieur |
| 6,254,807 | B1 | 7/2001 | Schmidt et al. |
| 6,413,449 | B1 | 7/2002 | Wieland et al. |
| 2003/0017105 | A1 | 1/2003 | Wang et al. |
| 2003/0153455 | A1 | 8/2003 | Wang et al. |

FOREIGN PATENT DOCUMENTS

| | | |
|---|---|---|
| EP | 1013603 A1 | 6/2000 |
| EP | 1186335 A1 | 3/2002 |
| GB | 1003147 A | 7/1966 |
| JP | 61028451 | 2/1986 |
| WO | WO 02/102708 A1 | 12/2002 |
| WO | WO 03/035255 A2 | 5/2003 |

OTHER PUBLICATIONS

Das et al., "Influence of processing medium on retention of specific surface area of gamma-alumina at elevated temperature," Applied Catalysis A: General 207, pp. 95-102 (2001).

Ozawa et al., "Effect of Cerium Addition on the Thermal Stability of Gamma Alumina," J. Mater. Sci. Lett., 9, pp. 291-293 (1990).

McCabe et al., "The Effect of Alumina Phase Structure on the Dispersion of Rhodium/Alumina Catalysts," J. Catal. 151, pp. 385-393 (1995).

International Search Report WO 2005/003025A3.

Burtin et al., Influence of Surfaec Area and Additives on the Thermal Stability of Transition Alumina Catalyst Supports. I: Kinetic Data 34, pp. 225-238 (1987).

Sehested et al., "Sintering of Nickel Steam-Reforming Catalysts on $MgAl_2O_4$ Spinel Supports," J. Catal. 197, pp. 200-209 (2001).

Office Action from Chinese Patent Office, mailed Feb 9, 2007 (English translation).

Yeung et al., Mesoporous alumina membranes: Synthesis, characterization, thermal stability and nonuniform distribution of catalyst, J. Membrane Science 131, pp. 9-28 (1997).

Advisory Action from US 10/778,891.

Final Office Action from US 10/778,891.

STEAM REFORMING METHODS AND CATALYSTS

RELATED APPLICATIONS

In accordance with 35 U.S.C. sect. 119(e), this application claims priority to U.S. Provisional Application Nos. 60/482,351, filed Jun. 25, 2003.

FIELD OF THE INVENTION

The invention relates to catalysts, systems and methods of steam reforming; and methods of making steam reforming catalysts.

BACKGROUND OF THE INVENTION

Steam reforming is a chemical process in which a hydrocarbon is reacted with steam ($H_2O$) to form hydrogen ($H_2$), CO and $CO_2$. For decades, steam reforming has been the principal industrial process for making hydrogen. More recently, steam reforming has attracted great interest as a possible means to supply hydrogen for fuel cells. There have been intensive research efforts over many years to improve the steam reforming process. Despite these efforts, problems continue to exist with catalyst performance and/or cost, and the need for catalyst replacement or regeneration due to the rather harsh conditions (high temperature and steam) in which steam reforming is typically conducted.

Known steam reforming catalyst support materials include gamma alumina doped with a stabilizing element such as magnesium, lanthanum, and barium. Incorporation of a stabilizer could delay the irreversible transformation of gamma alumina into alpha alumina. However, under severe steam reforming conditions the supports continually sinter, resulting in a permanent loss of active sites.

The effect of rare earth elements and alkaline earth elements as dopants for alumina has been investigated. See Church et al., *Appl., Catal., A,* 101 (1993) 105. Wachowski, et al., *Mater. Chem. and Phys.,* 37 (1994) 29. Some studies have indicated that there is a correlation between final surface area of alumina treated at high temperatures (1200° C.) and ionic radius of the dopant. Mizukami et al., in A. Cruca (Ed.), *Studies in surface science and catalysis*, Vol 71, Elsevier Amsterdam, 1991, 557, reported that $La^{3+}$ and $Ba^{2+}$ are the most effective dopants among rare earths and alkaline earths, which are large ions with high ionic charges. Yeung et al., *J Membrane Sci.,* 131 (1997) 9, described procedures for making mesoporous alumina membranes by slip casting a 1 M alumina sol (6 wt %) containing 3 atom % of a nitrate of Y, Ba, La, and Ce. Das et al. in Appl. Catal. A: 207, 95-102 (2001), reported that a more stable La-doped support could be obtained by processing in ethanol rather than water. Martin et al. in Appl. Catal. A: 131, 297-307 (1995) described experiments in which Rh was sintered on alumina under $H_2$ at temperatures of 700 to 900° C.; under these conditions, the mean Rh particle size varied from 1.1 to 2.1 nm. Temperature Programmed Reduction (TPR) data was also reported. Schaper et al., in *Sintering—Theory and Practice*, Proceedings of the 5$^{th}$ International Round Table Conference on Sintering, Material Science Monographs, vol. 14, pp173-176, reported on the influence of Mg, Cr, La and Zr on the stability of gamma alumina catalyst supports and concluded that only lanthanum resulted in a significant improvement in stability against sintering.

Treatment in 10% flowing $H_2O$ has been used to pre-age a support for a catalytic convertor. McCabe et al. in J. Catal. 151, 385-393 (1995), reported that presteaming alumina at 1223 K with 10% $H_2O$ in flowing air for 24 hours prior to Rh impregnation eliminated irreversible occlusion of Rh during subsequent hydrothermal aging.

Wang et al. in US published patent application 2003/00317105 described methods and catalysts for steam reforming. In one preferred embodiment, the catalyst includes Rh on a Mg—Al spinel. This reference does not describe pretreatment of the support at elevated steam pressure.

Despite extensive efforts over many years, there remains a need for catalytic systems and steam reforming methods that have high performance and stability under the hydrothermal conditions that are typical of steam reforming. Also, despite extensive efforts, there remains a need for better methods of making steam reforming catalysts.

SUMMARY OF THE INVENTION

In a first aspect, the invention provides a method of making a steam reforming catalyst composition, comprising: providing a coating composition comprising an alumina precursor; applying the composition onto a substrate to form a coated substrate; providing an alumina stabilizer; drying the coated substrate to form a dried support; and hydrothermally pre-aging the dried support in a gas atmosphere comprising at least 1 atm $H_2O$ (partial pressure) and a temperature of at least 850° C. to form a hydrothermally stabilized support.

In another aspect, the invention provides a steam reforming catalyst, comprising: a Mg and Al containing spinel support; and Rh on the surface of the support; and being characterizable by a stability and reactivity such that, when tested in a flowing stream of methane and water in a water:methane ratio of 3 at 15 atm, a test reactor wall temperature of 880° C. (this temperature is measured by a thermocouple attached to a 0.020 inch (0.051 cm) thick metal wall (Inconel® 617 if available) opposite a point where the catalyst (or finned catalyst support) is in direct contact with the wall; this temperature is believed to be within 10° C. of the actual catalyst skin temperature), and a contact time of 5 ms or less that is adjusted to obtain a methane conversion (after 100 hours time-on-stream (TOS)) of 70% at a pressure of 15 atm (total combined pressure of methane and steam), and then maintaining the same conditions for 1000 hours, there is a continuous period of at least 400 hours (during the 1000 hours) in which the methane conversion changes by 3% or less. Methane conversion may be conveniently measured by gas chromatography. To measure this property, it is important to provide sufficient heat to maintain temperature. This should be done by placing the catalyst inside a half-flattened metal rod with a rectangular channel that is 5 cm long, 0.3 inch (7.6 mm) wide and 0.02 inch (0.5 mm) high, and loading with a length of 0.7 inch (1.8 cm) of catalyst. One side of the metal rod has been removed to place a thermocouple adjacent to the catalyst chamber (thus, the "flattened" form). If the form of the catalyst makes this placement impossible, catalyst can be tested in a packed bed in a more conventional tube, if necessary with dilution of the catalyst with alumina in order to prevent cold spots. The invention further includes a catalyst system that includes this catalyst, preferably in the presence of steam and a hydrocarbon.

For purposes of this invention, the protocol for analyzing catalyst properties uses the technique for temperature measurement that is described in the aspect above. The test reactor for measuring catalyst properties should be the half-flattened metal rod that is described in the Examples section. This test procedure is chosen because it best conforms with the data; in a less preferred embodiment, the catalyst properties can be alternatively defined as being measured at a catalyst skin temperature of 870° C.

Unless stated otherwise, "conversion percent" refers to absolute conversion percent throughout these descriptions. "Contact time" is defined as the total catalyst chamber volume (including the catalyst substrate volume) divided by the total volumetric inlet flowrate of reactants at standard temperature and pressure (STP: 273K and 1.013 bar absolute). Catalyst chamber volume includes any volume between a catalyst coating (or other flow-by catalyst arrangement) and the opposite wall of a reaction channel.

In a further aspect, the invention provides a composition comprising a Mg and Al containing spinel material. This composition has a hydrothermal stability such that, when tested by treating the composition at 925° C. and 15 atm $H_2O$, for 100 hours, the support has a surface area of at least 10 $m^2/g$. This composition is intended for use as a catalyst support or a precursor for a catalyst support. In a preferred embodiment, the composition is a catalyst composition comprising Rh on the surface.

In another aspect, the invention provides a method of methane steam reforming that comprises conducting a reaction in which methane and steam contact a catalyst at a temperature of at least 800° C. for at least 1000 hours of continuous operation (i.e., operation without regeneration), wherein the catalyst comprises a stabilized alumina support and a catalytically active material; and further characterized by one or more of the following sets of conditions and process characteristics: (a) a contact time of 15 ms or less while achieving an average approach to equilibrium conversion of greater than 80%, preferably greater than 90%, still more preferably greater than 95%, and most preferably greater than 98%; (b) a contact time of 10 ms or less while achieving an average approach to equilibrium conversion of greater than 70%, preferably greater than 80%, still more preferably greater than 90%, and most preferably greater than 95%; or (c) a contact time of 5 ms or less while achieving an average approach to equilibrium conversion of greater than 65%, preferably greater than 75%, still more preferably greater than 85%, and most preferably greater than 90%.

For all of the above conditions, the approach to equilibrium conversion is the ratio of measured hydrocarbon conversion to equilibrium hydrocarbon conversion, as shown below:

$$\frac{\left(\frac{\text{moles hydrocarbon in} - \text{moles hydrocarbon out}}{\text{moles hydrocarbon in}}\right)_{measured}}{\left(\frac{(\text{moles hydrocarbon in})_{measured} - (\text{moles hydrocarbon out})_{equilibrium}}{(\text{moles hydrocarbon in})_{measured}}\right)}$$

The equilibrium composition (or moles hydrocarbon out at equilibrium) is based upon the measured average pressure of the inlet and outlet of the reactor zone and the inlet molar composition. The equilibrium distribution (or composition) for a given temperature, pressure, and inlet mole fraction distribution can be calculated using Gibbs free energies with programs such as the NASALEWIS equilibrium code or FACTSAGE.

For purposes of this invention, the temperature used to describe a method, such as the above-described aspect, is defined as the peak temperature (that is, the highest temperature) in the catalyst (sometimes also referred to by the equivalent term "peak catalyst bed temperature"). "Average approach to equilibrium conversion" is based on this peak temperature. Also, other variables such as contact time and productivity, when used to describe a method in conjunction with a temperature, are based on only those parts of the catalyst that are within 20° C. of the peak temperature. When used to describe the inventive methods, temperatures refer to catalyst skin temperatures that can be measured directly (this is preferred) or calculated by techniques known in the art. In the tests described in the Examples section, the temperature at any time in the catalyst chamber was essentially isothermal (that is, the temperature at any instant is believed to have varied by less than 20° C.).

In some preferred embodiments, the maximum catalyst temperature is 1050° C., more preferably 1000° C. or less, more preferably 950° C. or less, and in some embodiments, 900° C. or less. Additional, or narrower parameters, that may be used in preferred embodiments are described in the Detailed Description section.

In some embodiments, the temperature along the length of a catalytic reforming channel (preferably a microchannel) may be nearly isothermal, as defined within 20° C. from inlet to outlet. In some alternate embodiments, the temperature may vary along the length of the microchannel. For example, the temperature at the inlet of the catalyst zone of a microchannel may be considerably cooler than the outlet of the microchannel. In one example for methane steam reforming, the inlet temperature of the catalyst zone may be around 650° C. and the end of the catalyst section may be around 850° C. The temperature may rise monotonically in a linear fashion or may rise more quickly near either the front or end of the catalyst bed. Thus, in some examples, the section of the catalyst containing microchannel that exceeds 800° C. may only include the final 75%, or 50%, or 25%, or 10% of the catalyst bed, or any value therewithin. For the example of a temperature profile ranging from 650° C. to 850° C., the reaction may equilibrate near 840° C. and demonstrate an approach to equilibrium greater than 80% as defined by the peak temperature. The equivalent contact time spent in the reaction zone that exceeds 800° C. may be considerably less than the overall reaction contact time as defined by the entire reaction channel volume (i.e., the volume of the channel containing catalyst). As an example, the contact time within the entire reaction channel volume may be 5 ms, but only 1 ms in the reactor section that exceeds 800° C. It is envisioned that the contact time spent in the reaction zone exceeding 800° C. required to achieve at least 80% approach to equilibrium defined at peak temperature will exceed 0.1 ms. In some embodiments, the temperature of the catalyst-containing microchannel may be highest near the end of the reaction zone, or, alternatively, may be higher at the front or middle of the reactor rather than near the end of the reaction zone.

In another aspect, the invention provides a method of methane steam reforming, comprising: passing a steam comprising methane and water in a steam to carbon ratio of 3 or less through a catalyst at a contact time of 10 ms or less and maintaining the same conditions for at least 1000 hours, wherein there is a continuous period of at least 500 hours in which the methane conversion changes by 3% or less; and wherein at least 2 mol of methane are converted per gram catalytically active material each minute.

In a further aspect, the invention provides a steam reforming catalyst comprising: a stabilized alumina support; and rhodium. This catalyst is characterizable by a stability such that, when tested according to Test Procedure 1 (see Detailed Description), after 595 hours of continuous operation, the conversion of methane is at least 80% of equilibrium and the conversion is diminished by less than 5%.

A "stabilized alumina support" comprises a stabilizing element that enhances stability in steam reforming conditions. As is conventional patent terminology, "comprising" means including and when this term is used the invention can, in some narrower preferred embodiments, be described as "consisting essentially of" or in the narrowest embodiments as "consisting of." Aspects of the invention described as "comprising a" are not intended to be limited to a single component, but may contain additional components.

In a further aspect, the invention provides a method of making a steam reforming catalyst, comprising: providing a support material comprising alumina and at least one stabilizing agent selected from the group consisting of magnesium, lanthanum, barium, and strontium; and heat treating the support material by heating in the range of 850 to 1100° C., in the presence of oxygen; and depositing a steam reforming catalyst metal. The step of heat treating is conducted in an atmosphere containing less than 5% $H_2O$.

In another aspect, the invention provides a steam reforming catalyst comprising: a stabilized alumina support; and catalytically active particles on the surface of the stabilized alumina support; wherein the catalytically active (preferably rhodium) particles have a mean particle size in the range of 2.0 to 4.0 nm, more preferably 2.5 to 3.5 nm, as measured by electron microscopy, where the mean is based on the number (not mass) of particles. In some embodiments, the catalyst comprises a stabilized alumina support with Rh particles on the surface of the stabilized alumina support; wherein the rhodium particles have an average size of 2.0 to 3.0 nm.

In a further aspect, the invention provides a method of making a steam reforming catalyst comprising: providing a stabilized alumina support; depositing Rh on the stabilized alumina support; and reducing the Rh in a $H_2$-containing stream at a temperature of 200 to 300° C.

In some aspects, the present invention is defined as catalysts or catalyst systems containing stabilized alumina and Rh that are characterized by surprisingly good stability and conversion or selectivity. It may be subsequently discovered that other supports or catalyst metals may perform equivalently if substituted for the Mg stabilized alumina and/or Rh in these catalysts or catalyst systems; however, the present inventors are not presently aware of any such equivalent materials. In some other aspects, the invention is described more broadly; for example, the invention discloses superior methods (both synthetic methods as well as steam reforming methods) that encompass a broader range of materials.

The invention includes methods of steam reforming, reactors, and fuel processing systems that use the catalysts described herein. Furthermore, methods of making catalyst according to the present invention include: 1) methods of making highly stable suspended catalyst particles in liquid medium, 2) methods of modifying the liquid suspension properties to achieve an adherent, uniform coating on a reactor wall or on catalyst substrates such as felts, foams, ceramics and metal flat surfaces, 3) coating methods to achieve uniform catalyst coatings with excellent adhesion to a substrate in short catalyst preparation time (e.g., in dip coating, reduced dips).

Various embodiments of the invention can provide numerous advantages such as one or more of the following: improved catalyst performance, high stability under steam reforming conditions (steam, high temperature and high pressure), high conversions at relatively short contact times, selectivity control, lower cost, ease of manufacturing, and low temperature operation.

DESCRIPTION OF PREFERRED EMBODIMENTS

Figure 1:
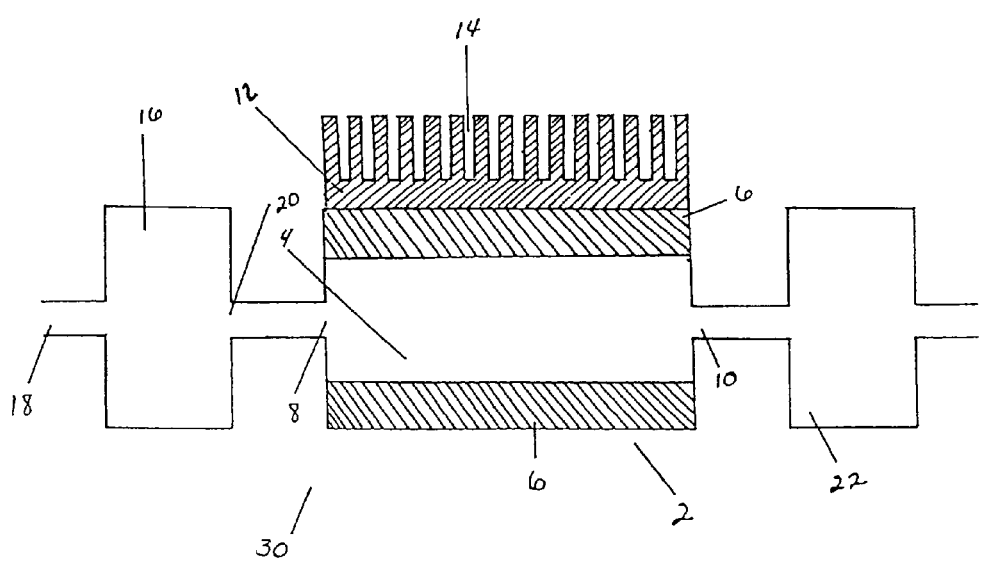
FIG. 1 is a representational, schematic, cross-sectional view of reactor apparatus that can be utilized in some embodiments of the present invention.

A steam reforming process requires a hydrocarbon (or hydrocarbons) and steam ($H_2O$). A reactant mixture can include other components such as CO or nonreactive diluents such as nitrogen or other inert gases. In some preferred processes, the reaction stream consists essentially of hydrocarbon and steam. In some preferred embodiments, the steam to carbon ratio in a reactant stream is 3 to 1 to 1 to 1, and in some embodiments 1.5 to 1 or less.

Hydrocarbons according to the present invention include: alkanes, alkenes, alkynes, alcohols, aromatics, and combinations thereof including fuels such as gasoline, kerosene, diesel, JP-8. Preferably, the hydrocarbon is an alkane or a fuel. Preferred alkanes are $C_1$-$C_{10}$ alkanes, such as methane, ethane, propane, butane, and isooctane.

The catalyst requires catalytically active surface sites that reduce the kinetic barrier to the steam reforming reaction. The catalyst comprises one or more of the following catalytically active materials: ruthenium, rhodium, iridium, nickel, palladium, platinum, and carbide of group VIb. Rhodium is particularly preferred. The catalytically active materials are typically quite expensive, therefore it is desirable to minimize the amount used to accomplish the desired performance. In some preferred embodiments, the catalyst (including all support materials) contains 0.5 to 10 weight percent, more preferably 1 to 3 wt % of the above-mentioned catalytically active materials. In some preferred embodiments, the sum of stabilized alumina support plus catalytically active materials contains 0.5 to 10 weight percent, more preferably 1 to 7 wt %, and still more preferably 2 to 5 wt % catalytically active materials.

The catalyst also contains an alumina support for the catalytically active materials. An "alumina support" contains aluminum atoms bonded to oxygen atoms, and additional elements can be present. Preferably, the alumina support comprises stabilizing element or elements that improve the stability of the catalyst in hydrothermal conditions. Stabilizing elements typically are large, highly charged cations. Examples of stabilizing elements are Mg, Ba, La, and Y, and combinations of these. In this invention, a "stabilized alumina support" is an alumina support containing at least one stabilizing element. Preferably, the stabilized alumina support contains 1 to 10, more preferably 3 to 7 weight percent of stabilizing elements. Several workers have reported that La is a better stabilizer than Mg; with Schaper et al., reporting that while La stabilized the alumina, Mg had no effect. We have surprisingly found that Mg works better than La in stabilizing a support in hydrothermal conditions. Therefore Mg—Al spinel is a particularly preferred support for steam reforming.

Preferably, the catalytically active materials (such as Rh) are present in the form of small particles on the surface of the stabilized alumina support. More preferably, the particles of catalytically active material have a mean particle size in the range of 2.0 to 4.0 nm, more preferably 2.5 to 3.5 nm, as measured by electron microscopy, where the mean is based on the number (not mass) of particles.

The catalyst can be in the form of particles, preferably having diameters less than 4 mm, more preferably less than 1 mm. More preferably, the stabilized alumina forms a layer (of agglomerated particles or a continuous film) having a thickness less than 4 mm, more preferably less than 1 mm, and still more preferably a thickness of less than 40 μm. This layer is preferably disposed on a porous substrate. Preferably the catalyst contains an alumina layer disposed on a thermally conductive surface. The surface could be, for example, a porous substrate or reaction chamber wall(s).

In some embodiments, a stabilized alumina layer is coated over, and preferably in direct contact with, a high surface area material such as alumina, preferably (gamma)-alumina. This configuration provides high surface area for good metal dispersion and/or high metal loadings and also provides a stabilized alumina layer for excellent stability. The high surface area material is porous; the meaning of a stabilized alumina "disposed over" or "coated over" a high surface area material means that the stabilized alumina may also coat crevices and cavities within a high surface area material or within a large pore substrate.

In some preferred configurations, the catalyst includes an underlying large pore substrate. Examples of preferred large pore substrates include commercially available metal foams and, more preferably, metal felts. Prior to depositing any coatings, a large pore substrate has a porosity of at least 5%, more preferably 30 to 99%, and still more preferably 70 to 98%. In some preferred embodiments, a large pore substrate has a volumetric average pore size, as measured by BET, of 0.1 μm or greater, more preferably between 1 and 500 μm. Preferred forms of porous substrates are foams and felts and these are preferably made of a thermally stable and conductive material, preferably a metal such as stainless steel or FeCrAlY alloy. These porous substrates can be thin, such as between 0.1 and 1 mm. Foams are continuous structures with continuous walls defining pores throughout the structure. Felts are nonwoven fibers with interstitial spaces between fibers and includes tangled strands like steel wool. Felts are conventionally defined as being made of nonwoven fibers. In one embodiment, the large-pore substrate has a corrugated shape that could be placed in a reaction chamber (preferably a small channel) of a steam reformer. Various substrates and substrate configurations are described in U.S. Pat. No. 6,680,044 which is incorporated by reference. Another preferred substrate is a finned substrate that is characterized by the presence of fins (such as square-wave type fins) on the substrate's surface. Alternatively, the catalyst may take any conventional form such as a powder or pellet.

A catalyst with a large pores (and including the alumina-supported catalytically active sites) preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In some preferred embodiments, the catalyst comprises a metal, ceramic or composite substrate having a layer or layers of a catalyst material or materials deposited thereon. The porosity can be geometrically regular as in a honeycomb or parallel pore structure, or porosity may be geometrically tortuous or random. Preferred porous support materials include felts (nonwoven fibers or strands), foams (including a foam metal or foam ceramic), fins and honeycombs. In embodiments employing a porous substrate, the average pore size (volume average) of the catalyst layer(s) is preferably smaller than the average pore size of the substrate.

In a particularly preferred embodiment, alumina is deposited on a finned metal substrate and a catalytic metal is deposited on the alumina. Preferably, this support is a thermally conductive metal that is sized to fit within a microchannel. Alternatively, the finned support could be fabricated directly within the microchannel and be integral to the microchannel. One method of fabrication within a microchannel comprises the use of a slitting saw, partial etching using a photochemical process, or a laser EDM. This type of support provides numerous advantages including: high heat flux with short heat transfer distances, high surface area, and low pressure drop. Preferably, the support has a height (including fins) of less than 5 mm and preferably less than 2 mm and a fin-to-fin separation of 1000 μm or less, and in some embodiments, a fin-to-fin separation of 150 to 500 μm. The fin structure can be integral with a reaction chamber (and thus coated in situ), or as a separate insert that can be coated prior to being inserted into a reaction chamber.

In some embodiments, the catalyst, including the presence of catalytically active surface sites, as measured by BET, has a volumetric average pore size of less than 0.1 micrometer (μm). The catalyst, including the presence of catalytically active surface sites, as measured by BET, nitrogen physisorption, preferably has a surface area of more than 10 m$^2$/g, and in some embodiments a surface area of 20 to 500 m$^2$/g.

Conventional catalysts typically undergo large decreases in surface area when exposed to hydrothermal conditions. Preferred catalysts of this invention have a surface area, as measured by N$_2$ adsorption BET, of at least 5 m$^2$/g, more preferably at least 10 m$^2$/g, and in some embodiments 5 to about 20 m$^2$/g; and preferably maintain these surface areas after exposure to 25 atm steam for 100 hours.

Certain aspects of the invention can best be described in terms of properties such as stability, conversion or selectivity. Both the catalysts and methods can be characterized in terms of hydrocarbon conversions and selectivities in steam reforming processes. Hydrocarbon conversion is preferably at least 50%, more preferably at least 80% and still more preferably at least 90%. The foregoing conversion values can be either absolute or equilibrium conversions. If not specified, it is conventional to consider conversion values to be absolute conversions. Under conditions where conversion approaches 100%, absolute and equilibrium conversion is the same. "Equilibrium conversion" is defined in the classical manner, where the maximum attainable conversion is a function of the reactor temperature, pressure, and feed composition. For the case of hydrocarbon steam reforming reactions, the equilibrium conversion increases with increasing temperature and decreases with increasing pressure. In some embodiments, hydrocarbon equilibrium conversion is in the range of 70 to 100%.

Hydrogen selectivity, defined as moles H atoms in H$_2$ in the product gas divided by moles H in all product gases, is preferably at least 50%, more preferably at least 60%, still more preferably at least 85%, and yet still more preferably at least 95%. For some embodiments, carbon monoxide selectivity is preferably less than 65%, more preferably less than 40%.

In some preferred embodiments, the catalyst is characterizable by a stability and reactivity such that, when tested in a flowing stream of methane and water in a water:methane ratio of 3 at 15 atm, a catalyst temperature (actually a reactor wall temperature as explained above) of 880° C., a reactor pressure of 15 atm (note that in the reactor design described in the Examples section, pressure drop through the reactor is negligible) and a contact time of 5 ms or less that is adjusted to obtain a methane conversion (after 100 hours TOS) of 70%, and maintaining the same conditions for 1000 hours, there is a continuous period of at least 400 hours (more preferably at least 600 hours, and in some embodiments from 400 to about 2800 hours TOS) in which the methane conversion changes by 3% or less. To measure this property, it is important to provide sufficient heat to maintain temperature. This should be done by placing the catalyst inside a metal tube with a rectangular channel cut through the long axis of the metal tube, the channel being 5 cm long, 0.3 inch (7.6 mm) wide and 0.02 inch (0.5 mm) high, and loading into the channel a length of 0.7 inch (1.8 cm) of catalyst. If the form of the catalyst makes this impossible, catalyst can be tested in a more conventional tube, if necessary with dilution of the catalyst with alumina in order to prevent cold spots. The invention further includes a catalyst system that includes this catalyst, preferably in the presence of steam and a hydrocarbon.

In some preferred embodiments, the catalysts, systems and methods can be characterized by a stability such that after 595 hours of continuous operation in hydrocarbon steam reforming conditions, the conversion of hydrocarbon is at least 70%, more preferably at least 80%, still more preferably at least 85%, and in some embodiments 80 to about 90% of the equilibrium conversion, and where the conversion has diminished by less than 10%, more preferably less than 5%, and still less preferably less than 3% over the 595 hours of continuous operation. Selectively to CO is preferably essentially unchanged over the course of the 595 hours of continuous operation. "Systems" are formed by a catalyst in conjunction with a reactor, preferably a microreactor.

Some preferred embodiments of the inventive catalysts and methods may also be described in terms of their exceptionally high activity. Preferably, the catalyst possesses a catalytic activity such that, when exposed to a stream of CH$_4$ and H$_2$O at a steam-to-carbon ratio of 3, at a catalyst temperature of 840° C. and a pressure of 27 atm at a flow rate of 6000 SLPM (standard liters per minute measured at 0° C. and 1 atm) total flow per gram of catalytically active material, the catalyst converts methane to products at a rate of at least 2 mol CH$_4$/g catalytically active material, more preferably at least 10, still more preferably at least 25, and in some embodiments 3 to about 50 mol CH$_4$/g catalytically active material. This activity is preferably maintained for at least 400 hours, more preferably at least 600 hours.

In another aspect, the invention provides a method of methane steam reforming, comprising: passing a steam comprising methane and water in a steam to carbon ratio of 3 or less through a catalyst at a contact time of 10 ms or less and maintaining the same conditions for at least 1000 hours, wherein there is a continuous period of at least 500 hours in which the methane conversion changes by 3% or less; and wherein at least 2 mol of methane are converted per gram of catalytically active material each minute.

In some embodiments, a catalyst's properties (such as stability, conversion and selectivity) are defined by the following test procedure (referred to as "Test Procedure 1"). In this test procedure, about 7 mg of catalyst is loaded into a reaction chamber that is a 0.162 inch×0.021 inch×2.0 inch (4.1×0.53×51 mm) slot in a 0.5 inch (1.3 cm) diameter solid Inconel 617 rod. If necessary, the catalyst can be crushed, cut or scraped from a larger piece of catalyst to obtain a catalyst that will fit in the slot. The catalyst can be on a finned support (as described in the examples) or in other forms such as pellets or powders. The catalyst is reduced to an optimal extent, as can be determined through routine experimentation. The reduction is under flowing hydrogen, typically in the range of 300 to 500° C. Then the reactor is pressurized to 15 atm under an inert atmosphere, and then heated in nitrogen to the reaction temperature. In this test procedure, the steam reforming reaction is carried out at 850° C., a steam:methane ratio of 3:1, at 15 atm and a contact time of 4.5 milliseconds. Catalyst packing can be varied to obtain this pressure and contact time; if the exact conditions cannot practically be obtained, results can be extrapolated to estimate results at the specified conditions. In this procedure, pressure drop through the reaction chamber is preferably 10 psig or less. In preferred embodiments of a catalyst tested with this procedure there is at least 85% methane conversion, and, in some embodiments 80 to about 90% methane conversion. CO selectivity is preferably at least 50% and remains constant.

The present invention also provides methods of steam reforming in which a hydrocarbon is reacted with water vapor at short residence times (or alternatively, described in contact times) over the catalysts described herein. The residence time is preferably less than 0.1 s. Short contact times are preferably 5-100 milliseconds (msec), in some embodiments, 10-25 msec.

The steam reforming reaction is preferably carried out at more than 400° C., more preferably 500-1000° C., and still more preferably 650-900° C. The reaction can be run over a broad pressure range from sub-ambient to very high, in some embodiments the process is conducted at a pressure of from 10 atm to 30 atm, more preferably 12 atm to 25 atm. The $H_2O$ partial pressure is preferably at least 0.2 atm, in some embodiments at least 2 atm, and in some embodiments in the range of 5 atm to 20 atm.

The catalyst support is made from a composition that includes an alumina precursor. An "aluminum precursor" is any form of aluminum (such as an alumina slurry) that can be used to form solid alumina. The catalyst may be made starting from an alumina sol or solid alumina. Suitable, commercially available materials include colloidal alumina suspended in aqueous medium from Sasol, or Engelhard alumina ground to a particle size of 70-100 mesh.

Starting from alumina particles, a slurry can be prepared by milling in water or organic phase. Stabilizing elements can be added as solids or in solution. It has been discovered that adding acid to adjust the pH to 3 to 6, preferably 5 to 6, results in a stable slurry even for solid contents greater than 20 wt %, and in some cases solid content in the range of 15 to 25 wt %. Adding a binding agent to the milled alumina can improve slurry characteristics.

Once alumina has been stabilized, it can be dried before a subsequent pre-aging treatment. Drying can be accomplished by removing or evaporating a liquid phase of the slurry; alternatively the slurry can be coated on a porous substrate and then dried prior to a subsequent pre-aging treatment.

A stabilized alumina is preferably subjected to a pre-aging treatment comprising a hydrothermal or thermal treatment, prior to applying a catalytically active material. In a hydrothermal treatment, the support material is exposed to steam at high temperature. Based on the results for which we have comparative data, we have discovered that thermal treatment of La-stabilized alumina at ambient conditions produces superior results as compared to hydrothermal treatments of La-stabilized alumina conducted at atmospheric pressure. In thermal pre-aging, the support materials are thermally treated at high temperatures in the absence of added water. Preferred conditions for the thermal treatment include heating to a temperature of from 1000 to 1150° C. A particularly preferred set of conditions for a nonhydrothermal treatment is heating at 1050-1100° C. for 24-50 hours in air at atmospheric pressure.

On the other hand, hydrothermal treatment of Mg-stabilized alumina at elevated pressure resulted in supports that are superior to both ambient pressure hydrothermal treatments and thermal treatments. Preferred hydrothermal pre-aging conditions include at least 5 atm partial pressure of steam, and at least 900° C., for a duration of at least 80 hours. More preferred conditions include at least 10 atm steam partial pressure, and in some embodiments 5 to 25 atm steam; temperatures of at least 900° C., more preferably at least 950° C., and in some embodiments 900 to 1100° C.; and times of at least 100 hours, and in some embodiments 50 to 300 hours.

When an underlying substrate is used, an alumina slurry or sol can be coated over the substrate at any stage in the preparative process. For example, particles of a stabilized and heat-treated alumina can be slurry coated onto the substrate followed by depositing, drying and activating a metal via the impregnation method. Alternatively, a vapor coat or soluble form of alumina (or other high surface area material) could be applied onto a substrate prior to addition of a catalytic metal. In another embodiment, the substrate may be coated with a buffer layer formed in situ using chemical vapor deposition. The buffer layer may not have a high surface area, but may be used to create a layer with a CTE (coefficient of thermal expansion) between the base metal substrate and the higher surface area catalyst support to promote good adhesion of the layers. The buffer layer may also be used to inhibit corrosion of the base metal substrate by creating a near dense and almost pin-hole free coating. Although solution (such as spray coating) or slurry coating is typically less expensive, vapor coating of the various materials could also be employed. The hydrothermal or thermal pre-aging treatment can be conducted either before or, preferably, after applying the alumina to a substrate.

A catalytically active material can be deposited onto alumina using known techniques such as the incipient wetness technique. Preferably, a precursor of the catalytically active material is added after the pre-aging treatment.

As described in the Examples section, the reduction temperature range for an alumina/Rh catalyst was studied by a temperature-programmed reduction technique. Although sintering might be expected at higher temperatures, it was surprisingly discovered that the activity of a catalyst reduced at 300° C. was better as compared to an identical catalyst reduced at 125° C. In some preferred embodiments, catalysts are reduced in a hydrogen atmosphere at temperatures in the range of 200-400° C., more preferably 250-350° C.; reduction at these temperatures results in substantially improved activity. It was found that the metal dispersion of a catalyst, as measured using a hydrogen chemisorption technique, showed higher dispersion on the catalyst reduced at 300° C. as compared to an identical catalyst reduced at 125° C.

The present invention includes methods and systems in which a steam reforming catalyst is disposed within a microchannel reaction channel. The height and/or width of a reaction microchannel (wall-to-wall, not counting catalyst) is preferably 5 mm or less, and more preferably 2 mm or less, and in some embodiments 50 to 1000 µm. Both height and width are perpendicular to the direction of flow. The length of a reaction channel is parallel to flow through the channel and is typically longer than height and width. Preferably, the length of a reaction chamber is greater than 1 cm, more preferably in the range of 1 to 100 cm. Typically, the sides of the reaction channel are defined by reaction channel walls. These walls are preferably made of a hard material such as a ceramic, an iron based alloy such as steel, or a nickel-based alloy. In some preferred embodiments, the reaction chamber walls are comprised of stainless steel or inconel which is durable and has good thermal conductivity.

In addition to the reaction channel(s), additional features such as microchannel or non-microchannel heat exchangers may be present. Microchannel heat exchangers are preferred. Adjacent heat transfer microchannels enable temperature in the reaction channel to be controlled precisely to promote steam reforming and minimize unselective reactions in the gas phase. The thickness of a wall between adjacent process channels and heat exchange channels is preferably 5 mm or less. Each of the process or heat exchange channels may be further subdivided with parallel subchannels. The heat exchange fluids can be gases or liquids and may include steam, liquid metals, or any other known heat exchange fluids. Especially preferred heat exchangers include combustors in which a fuel is oxidized to produce heat for the steam reforming reaction. The incorporation of a simultaneous exothermic reaction to provide an improved heat source can provide a typical heat flux of roughly an order of magnitude above the convective cooling heat flux. The flow of hot fluid through a heat exchanger may be cross flow, counter-flow or co-flow.

The reactors preferably include a plurality of microchannel reaction channels and/or a plurality of adjacent heat exchange microchannels. A plurality of microchannel reaction channels may contain, for example, 2, 10, 100, 1000 or more channels. In some preferred embodiments, multiple heat exchange layers are interleaved with multiple reaction microchannels (for example, at least 10 heat exchanger layers interleaved with at least 10 layers of reaction microchannels. Typically, flow into and/or out of some or all of a plurality of reaction channels passes through a manifold or manifolds that combines the fluid flow. In preferred embodiments, microchannels are arranged in parallel arrays of planar microchannels.

Preferred reactors usable in the present invention include those of the microcomponent sheet architecture variety (for example, a laminate with microchannels). Examples of integrated combustion reactors that could be used in the present invention are described in U.S. Pat. No. 7,250,151, filed Aug. 15, 2002, which is incorporated herein by reference. Some other suitable reactor designs and methods of making reactors are disclosed in U.S. patent application Ser. No. 6,989,134, filed Nov. 27, 2002, and U.S. Pat. No. 7,405,33, filed Apr. 7, 2003, which are also incorporated herein, in full, by reference.

The catalyst can fill up a cross-section of the reaction channel (a flow-through catalyst) or only occupy a portion of the cross-section of a reaction channel (flow-by). The use of a flow-by catalyst configuration can create an advantageous capacity/pressure drop relationship. In a flow-by catalyst configuration, gas preferably flows in a 0.1-2.0 mm gap adjacent to a porous insert or a thin layer of catalyst that contacts the microchannel wall (preferably the microchannel wall that contacts the catalyst is in direct thermal contact with a heat exchanger, preferably a heated fluid or exothermic reaction process stream contacts the opposite side of the wall that contacts the catalyst).

The reaction channel contains a steam reforming catalyst. Suitable catalyst structures include (but are not limited to) porous catalyst materials, fins, washcoats, pellets, and powders. In one preferred embodiment, a reaction channel contains a catalyst material that defines at least a portion of at least one wall of a bulk flow path. In this preferred embodiment, the surface of the catalyst defines at least one wall of a bulk flow path through which the mixture passes. During operation, the mixture flows through a microchannel, past and in contact with the catalyst in the microchannel. The term "bulk flow path" refers to an open path (contiguous bulk flow region) within the reaction chamber. A contiguous bulk flow region allows rapid gas flow through the reaction chamber without large pressure drops. In preferred embodiments there is laminar flow in the bulk flow region. Bulk flow regions within each reaction channel preferably have a cross-sectional area of $5 \times 10^{-8}$ to $1 \times 10^{-2}$ m$^2$, more preferably $5 \times 10^{-7}$ to $1 \times 10^{-4}$ m$^2$. The bulk flow regions preferably comprise at least 5%, more preferably 30-80% of either 1) the internal volume of the reaction chamber, or 2) the cross-section of the reaction channel. One example of a bulk flow path is the space between fins in a finned catalyst. When a combustion reaction is used to heat the steam reforming reaction chamber in an integrated combustion reactor, the combustion reaction preferably contains a bulk flow path having the properties discussed above.

In some embodiments, the catalyst is provided as a porous insert (such as a foam monolith) that can be inserted into (or removed from) each channel in a single piece; preferably the porous insert is sized to fit within a microchannel with a width of less than 2 mm. In some embodiments, the porous catalyst occupies at least 60%, in some embodiments at least 90%, of a cross-sectional area of a microchannel. In an alternative preferred embodiment, the catalyst is a coating (such as a washcoat) of material within a microchannel reaction channel or channels.

One embodiment of a reactor 2 is shown in cross-section in FIG. 1. The reaction chamber 4 contains catalyst 6 and has an inlet 8 and outlet 10. In FIG. 1, the catalyst is shown on the top and bottom of the reaction chamber with an open channel from the reactor inlet to the outlet—this configuration is called "flow-by." Other configurations, such as "flow-through" where flow is directed through a porous catalyst, are, of course, possible. To improve heat transfer, a microchannel heat exchanger 12 can be placed in contact with the reaction chamber. The microchannel heat exchanger 12 has channels 14 for passage of a heat exchange fluid. These channels 14 have at least one dimension that is less than 2 mm. The distance from the channels 14 to catalyst 6 is preferably minimized in order to reduce the heat transport distance. In preferred embodiments, a reaction chamber 4 is connected to fuel tank 16 such that fuel from the tank can flow into the reaction chamber. Although a fuel tank is shown in FIG. 1, it should be recognized that any fuel source, such as a pipeline could be used. A liquid fuel stream may flow through a separate vaporizer or be vaporized within a section of the steam-reforming reactor. In some preferred embodiments a fuel is vaporized in a microchannel vaporizer and/or preheated in a microchannel preheater. The product gases (including $H_2$) then may either flow into hydrogen input device 22, or the product of the reforming reactor may flow into a water gas shift reactor to convert some of the carbon monoxide into carbon dioxide and additional hydrogen. Additionally, the product stream may flow into a secondary clean up process to further purify hydrogen or reduce carbon monoxide. The secondary clean-up process may include a preferential oxidation reactor, membrane separation of either hydrogen or carbon monoxide, a sorption based separation system for either hydrogen or carbon monoxide, and the like. These elements form a highly simplified fuel processing system 30. In practice, fuel processing systems will be significantly more complex. Typically, heat from a combustor will be used to generate heat for other processes such as generating steam (not shown) that can be utilized for steam reformer and/or water gas shift reactor. The hydrogen input device 22, can be, for example: a fuel cell, a storage tank, a refueling station, a hydrocracker, hydrotreater, or an additional hydrogen purifier. In a fuel cell, the $H_2$ is combined with $O_2$ to generate electricity. Various fuel cells are well-known and commercially available and need not be described here.

EXAMPLES

To test stability and surface area, supports were prepared from a slurry in a two-step process and from a sol in a one-step process. The resulting supports were analyzed after various pretreatments.

Slurry Coating

Support powder was wet-milled in water or organic phase to a uniform particle size of 0.5 um. The pH was adjusted before the wet milling to 3-6, more specifically, 5-6. At this pH, the viscosity of slurry was lowered, allowing a higher solid concentration in the slurry while maintaining an effective milling. At these conditions, the catalyst particles are slightly charged and repelled from each other. The resulting catalyst slurry is highly stable with minimum particle agglomeration. Therefore, sedimentation rate was retarded, and uniform suspension in the liquid was maintained for days without the need of constantly agitating the slurry.

After the wet milling, binding agents such as alumina sol or surfactant were added to the slurry to improve interparticle adhesion. Addition of binders was done after the wet milling process, since binder could increase the slurry viscosity, reducing the overall effectiveness of wet milling. The viscosity of the slurry is adjusted once more just prior to coating the substrates by adding dilute nitric acid after the milling. This can improve flow during the coating process to achieve uniform coverage of catalyst slurry on the substrate with a high solid loading slurry. With high solid loading slurry, the number of dip coating cycles can be minimized to achieve the target catalyst loading on the substrates.

Dip coating or spin coating was used for coating substrates. Dip coating applies to foam or felt substrates with inner interstitial spaces, while spin coating was used for flat surfaces such as a ceramic plate or metal foil. In the dip coating process, uniformity of coating was achieved by withdrawing the substrate that was fully immersed in the slurry vertically at a fixed rate, between 5 cm/min and 20 cm/min. The coated substrate was then dried under controlled drying to achieve a crack-free coated catalyst layer. The dip coating process was repeated until the target weight gain was achieved. After drying the last coat, the substrate was annealed at high temperature. This step was carried out to improve the adhesion and to decompose the surfactant, if surfactant was added as binding agent.

Example 1

A 17 wt %-22 wt % solid loading catalyst slurry was prepared by mixing powder with deionized water. Two different powders were used for the ball mill, standard MgO—$Al_2O_3$ spinel and hydrothermally treated MgO—$Al_2O_3$ spinel. The hydrothermally treated spinel has a higher density than the fresh spinel due to the formation of alpha alumina during the hydrothermal treatment. Solid/liquid mixture was milled in a 2" ball mill bottle along with 3 mm alumina grinding balls for 24 or 62 h, depending on the type of the starting material. Standard MgO—$Al_2O_3$ required 24 h of milling while the hydrothermally treated MgO—$Al_2O_3$ required 62 h to achieve an average particle size that is less than 1 μm. After the milling, particle size analysis showed average particle sizes of 0.5 μm and 0.8 μm, for standard and hydrothermally treated catalysts, respectively. Nitric acid was added to adjust the pH to 4, and 1 wt % of PQ $Al_2O_3$ is added as binding agent. Changing the pH to 4.5-5 significantly reduced the slurry viscosity. Therefore, by modifying the pH, the slurry can be prepared with higher solid loadings, which reduces the number of dipping or spin coating in the coating steps, without compromising coating quality. In addition, it was found that the sedimentation rate of the higher solid loading slurries (17 to 22 solids %) was comparable to a pH-unmodified slurry with a much lower solid loading of 11%.

A catalyst slurry with 13.8 wt % solid loading was separately prepared by mixing slurry from Example 1 (above) with PQ $Al_2O_3$, surfactant polyoxyethylene 10 lauryl ether ($Cl_{12}EO_{10}$) and 2 wt %/$HNO_3$. The final weight ratio of slurry was: support powder:PQ $Al_2O_3$: $Cl_2EO_{10}$=100:5:8, pH=3.4.

Metal foils and metal felts were coated with the slurries. FeCrAlY intermetallic alloy in the form of felt (2"×0.35"× 0.01") structure was fired at 900° C. for 2 h in a box furnace. At this temperature, Al migrates to the surface and oxidizes to form a native alpha $Al_2O_3$ scale. The formation of a uniform layer of metal oxide scale on the intermetallic alloy substrates significantly improves the adhesion between the oxide coating and the alloy substrate. It is believed that the scale reduces the thermal expansion mismatch between the ceramic coating and the metal substrate, which could lead to spalling of catalyst layer. Upon cooling to room temperature, the felt was coated with the slurry from Example 1. The felt was first immersed vertically in the slurry, then withdrawn at a constant rate of 5-10 cm/min, dried at room temperature for 10 min, then dried at 110° C. in vacuum oven. The dip coating step was repeated 3 times to achieve the target weight loading density of 0.09 g cat/$in^2$. After the final drying, the substrate was calcined at 5° C./min to 500° C., and held at that temperature for 2 h. A control piece was made using the slurry without any modifications, dip coating without controlling the rate of substrate withdrawal. By modification of slurry pH, the slurry became less viscous, allowing a higher solid concentration without affecting the flow characteristic during dip coating. As a result, a uniform catalyst layer can be obtained in minimum number of dips. The dip cycle was reduced from 5 to 3 with an increase in solid loading of from 11 wt % to 22.20 wt %. Examining the coated substrate under a microscope showed a uniform coating layer with minimal cracks. In addition, adhesion was tested by sonicating the samples in petroleum ether for 30 min showing significant enhancement in adhesion for the slurry modified with 1 wt % of PQ $Al_2O_3$. The weight loss at the end of the sonication test was negligible.

FeCrAlY foil (0.02" thick) was cleaned in acetone and isopropanol prior to firing to 900° C. for 2 h. A layer of native alpha $Al_2O_3$ formed due to diffusion of Al to the surface. The substrate was then spin coated at 600 rpm for 30 seconds with slurry, dried at 200-300° C. on a hot plate for 0.5-1 min, the spin coating was repeated for 3-6 times to achieve the target weight loading, then calcined at 500° C. for 2 hrs. A hydrothermal test was performed on this foil at 900° C. with 60% $H_2O$ for 100 h at 12 atm in a sealed Inconel tube. After the hydrothermal test, the coated foil then underwent thermal cycling from 100° C. to 900° C. at a heating and cooling rate of 5° C./min for 10 times. No spalling of the catalyst powder was observed at the end of both tests.

Catalysts for comparing pre-aging treatments were prepared as described below. The catalyst was reduced under a 10% $H_2$ in $N_2$ stream at 300° C. for 1 hour.

A finned substrate was coated with both slurry (see above) and sol (see below) coating techniques. The finned substrate, which is more stable than felts in prolonged steam reforming conditions, were a thin FeCrAlY plate with surface fins. Width at the fin base is 0.16 inch (4.1 mm), length is 0.7 inch (1.8 mm), channel width is 0.15 inch (0.38 mm) and depth is 0.14 inch (3.6 mm); the fins are separated by 0.10 inch (2.5 mm) wide and 0.14 inch (3.6 mm) tall walls; forming a total of 6 channels through the finned support. These supports were cleaned and heat-treated to grow thin aluminum oxide layer. Each substrate was cleaned ultrasonically in 2-propanol and then 20 wt % nitric acid for 20 minutes. After rinsing with deionized water, the fins were dried at 100° C. for 30 minutes. The fins were then placed in a furnace in air and heated to 1000° C. at a rate of 3.5° C./min and held at 1000° C. for 8 hours, then allowed to cool to room temperature slowly (~3.5° C./min)

Solution (Sol) Coating Method:

A plate with surface fins was solution coated with alumina sol (AlOOH) and a solution containing stabilizing ion as follows:

1. Alumina sol (SASOL 14N4-25) was coated onto the fin surface by submerging the fin into the sol (ex-situ or in-situ). Remove the excess sol.
2. Dry the coated fin at 100° C. at a rate of 3.5° C./min for 1 hour.
3. Calcine the fin by heating to 450° C. at a rate of 3.5° C./min and hold at 450° C. for 4 hours, then allowed to cool to room temperature (3.5° C./min).
4. Stabilizing ion such as lanthanum ion, barium ion or magnesium ion was impregnated onto the alumina coated fin using 10 wt % aqueous solution of lanthanum nitrate, barium acetate, or magnesium nitrate by submerging the fin into the solution. Excess solution was removed.
5. Dry the coated fins at 100° C. at a rate of 3.5° C./min for 1 hour.
6. Calcine the fin by heating to 1000° C. at a rate of 3.5° C./min and hold at 1000° C. for 4 hours, then cooled to room temperature (3.5° C./min).
7. Pre-age (if utilized) the fins using the procedures in the following section.
8. Impregnate Rh metal onto the pre-aged fin by dipcoating into a 10 wt % solution of rhodium nitrate.
9. Dry the coated fins at 100° C. at a rate of 3.5° C./min for 1 hour.
10. Calcine the fin by heating to 950° C. at a rate of 3.5° C./min and hold at 950° C. for 1 hour, then allow them to cool to room temperature slowly (3.5° C./min).

Figure 2:
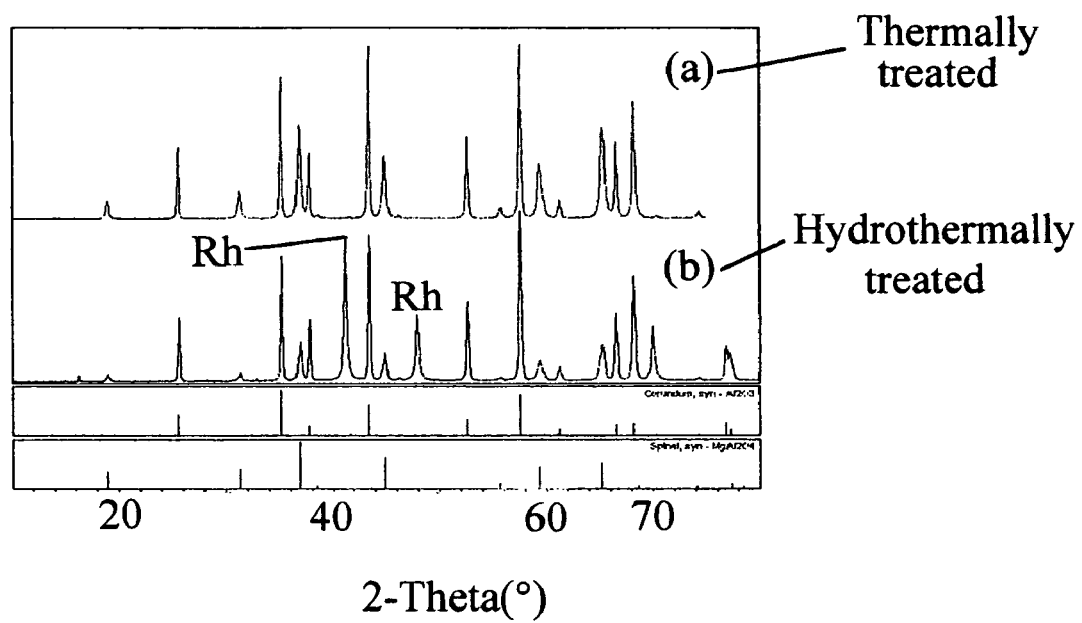
FIG. 2 shows of X-ray diffraction patterns of 6% $Mg/Al_2O_3$ treated under (a) thermal and (b) hydrothermal conditions.

An X-ray diffraction pattern of the thermally pre-aged material was compared to that of hydrothermally treated (at 1 atm) material in FIG. 2. FIG. 2(a) shows X-ray diffraction pattern of 6% Mg/$Al_2O_3$ thermally treated at 1100° C. for 24 hours whereas FIG. 2(b) shows the pattern for the same composition material hydrothermally treated at 900° C. and 12 atm for 100 hours in a flow of steam and nitrogen mixture at a ratio of 2 to 1. It was found that the major phases consist of alpha alumina and spinel phases. The relative intensity of peaks indicating the spinel phase was higher on the thermally treated sample (a) than the hydrothermally treated sample (b). Crystallinity of both samples was similar to each other, which is in agreement with the BET surface area results.

Surface Area

Figure 3:
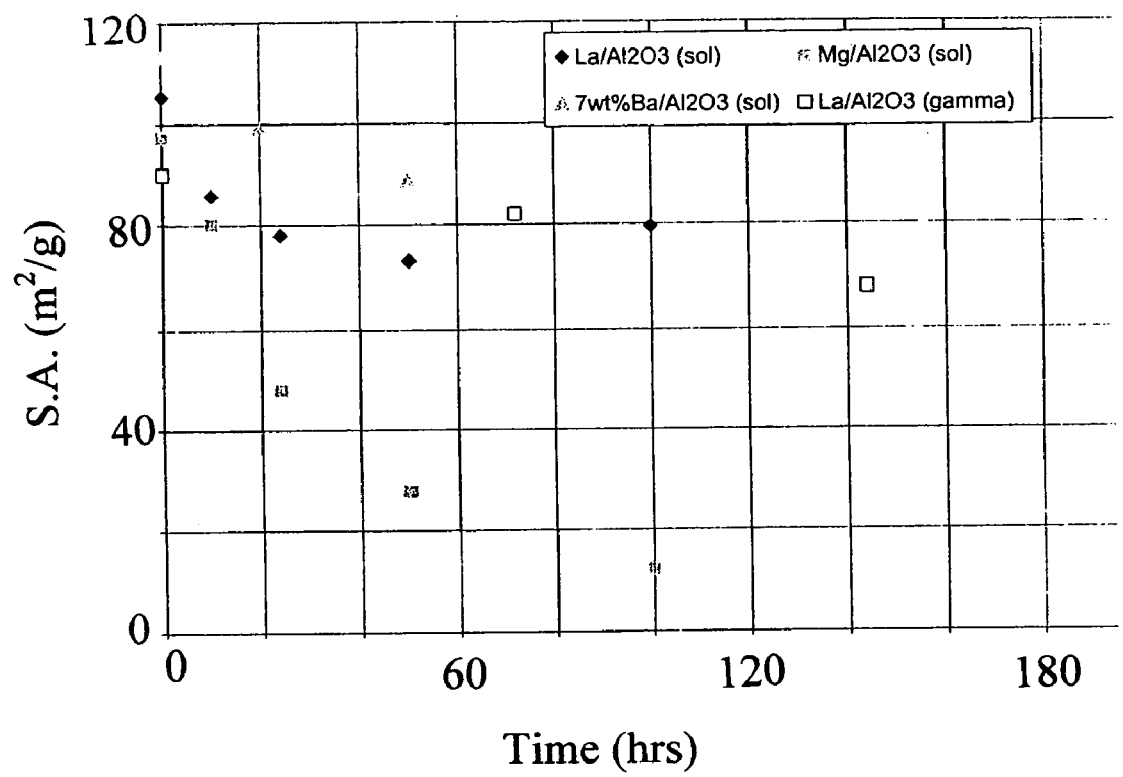
FIG. 3 is a plot of BET surface area vs. thermal aging time for sol-based 3% $La/Al_2O_3$, 10% $Mg/Al_2O_3$; and 7% $Ba/Al_2O_3$, 5% $La/Al_2O_3$ using $\gamma$-$Al_2O_3$ as starting material. The sol-based material was thermally treated at 1050° C. while others were treated at 1075° C. in air at atmospheric pressure.

In thermally pre-aged samples, La was found to be more effective than Mg in stabilizing the surface area. See FIG. 3. After aging at 1100° C. for 24 h, XRD analysis of a La stabilized $Al_2O_3$ sample showed a combination of delta, theta, and gamma alumina phases. Gamma alumina has the highest surface area among different phases of alumina.

Thermal treatment of sol-based lanthanum-, barium-, and magnesium-doped alumina was carried out in a powder form and BET surface area was measured. The thermally stabilized La-doped alumina was found to be more stable than the sample that was hydrothermally treated at ambient pressure. This trend was not observed for the material that was hydrothermally treated at 25 atm—in the samples hydrothermally pre-aged under increased pressure, the Mg-doped support was found to be the most stable. The Table below shows surface area stability of variously prepared alumina powders. The sol-derived powder exhibited the greatest surface area after hydrothermal treatment. Among three formulations (one-step $MgAl_2O_4$, two-step Mg/$Al_2O_3$, and two-step La/$Al_2O_3$), the Mg-containing supports had similar surface area around 44 $m^2$/g but the La-containing support had 59 $m^2$/g. Steam aging at 25 atm decreased the surface area by 86% and 94% on two-step 6% Mg/$Al_2O_3$ and two-step 3% La/$Al_2O_3$, respectively. However, the degree of surface area reduction was much smaller (54%) on one-step 6% $MgAl_2O_4$. This could be possibly due to the formation of more spinel (less isolated γ-alumina which transforms to α-alumina with increasing temperature) in the one-step method because of the intimate contact of Mg nitrate with AlOOH that can be achieved through this method. See the following table in which the atmosphere comprises 60% water, so $H_2O$ partial pressure at 25 atm is 15 atm.

TABLE

Surface Area of Treated Supports

| Treatment | One-step 6% $MgAl_2O_4$ $m^2$/g | S.A. reduction (%) |
|---|---|---|
| 1000° C., 4 hrs, air, 1 atm | 92.01 | |
| 925° C., 20 hrs, steam, 1 atm | 65.06 | 29.3 |
| 925° C., 100 hrs, steam, 1 atm | 44.17 | 52.0 |
| 925° C., 100 hrs, steam, 25 atm | 20.15 | 78.1 |
| 1050° C., 50 hrs | 39.84 | 56.7 |
| 1050° C., 100 hrs | | |

| | Two-step 6% Mg/$Al_2O_3$ $m^2$/g | S.A. reduction (%) |
|---|---|---|
| 1000° C., 4 hrs, air, 1 atm | 81.97 | |
| 925° C., 100 hrs, steam, 1 atm | 46.24 | 43.6 |
| 975° C., 200 hrs, steam, 1 atm | 46.29 | 43.5 |
| 925° C., 100 hrs, steam, 25 atm | 6.37 | 92.2 |
| 1050° C., 50 hrs | 27.50 | 66.5 |
| 1050° C., 100 hrs | 12.20 | 85.1 |

| | Two-step 0.4 wt % Mg/$Al_2O_3$/surf $m^2$/g | S.A. reduction (%) |
|---|---|---|
| 1050° C., 100 hrs | 48.84 | |

| | Two-step 3% La/$Al_2O_3$ $m^2$/g | S.A. reduction (%) |
|---|---|---|
| 1000° C., 4 hrs, air, 1 atm | 105.30 | |
| 925° C., 100 hrs, steam, 1 atm | 59.30 | 43.7 |
| 925° C., 100 hrs, steam, 25 atm | 3.28 | 96.9 |
| 1050° C., 50 hrs | 68.09 | 35.3 |
| 1050° C., 100 hrs | 79.50 | 24.5 |

| | Two-step 3% La/$Al_2O_3$/surf $m^2$/g | S.A. reduction (%) |
|---|---|---|
| 1000° C., 4 hrs, air, 1 atm | 65.33 | |
| 1050° C., 100 hrs | 54.60 | 16.4 |

Performance And Stability In Methane Steam Reforming Conditions

Figure 4A:
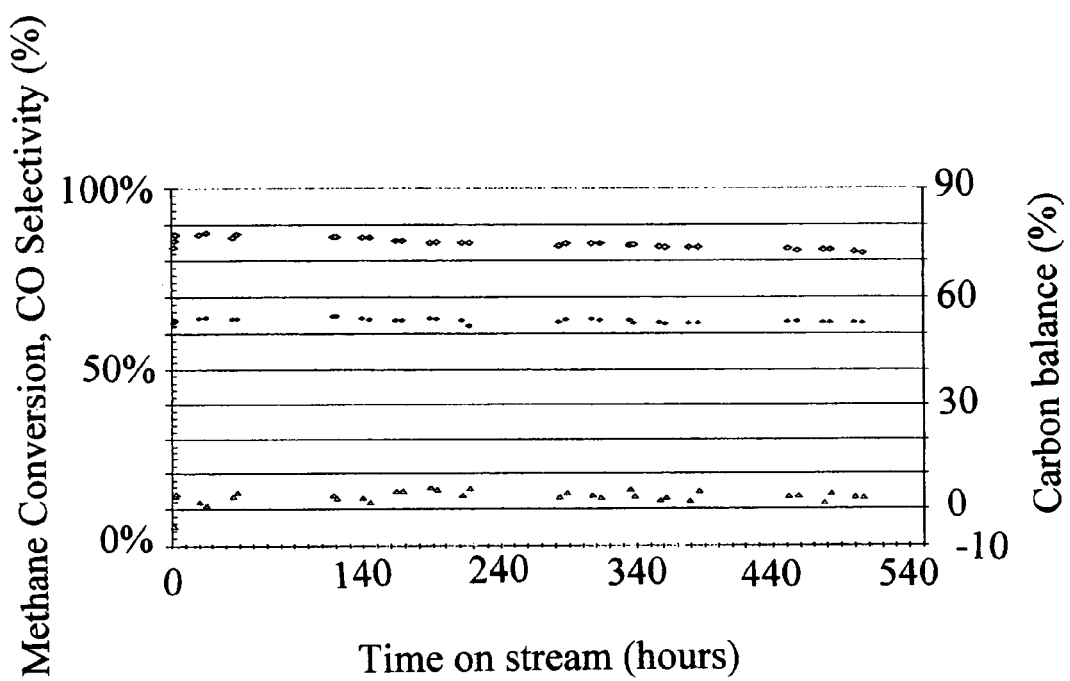
FIG. 4a shows steam reforming activity of a finned, coated catalyst system whose support has been hydrothermally treated at near ambient pressure (about 0.7 atm $H_2O$). Methane conversion ($\diamond$) is indicated in the range of 80 to 90% equilibrium selectivity, CO selectivity ($\blacklozenge$) in the range of 60 to 70% and carbon balance ($\Delta$) near zero.
Figure 4B:
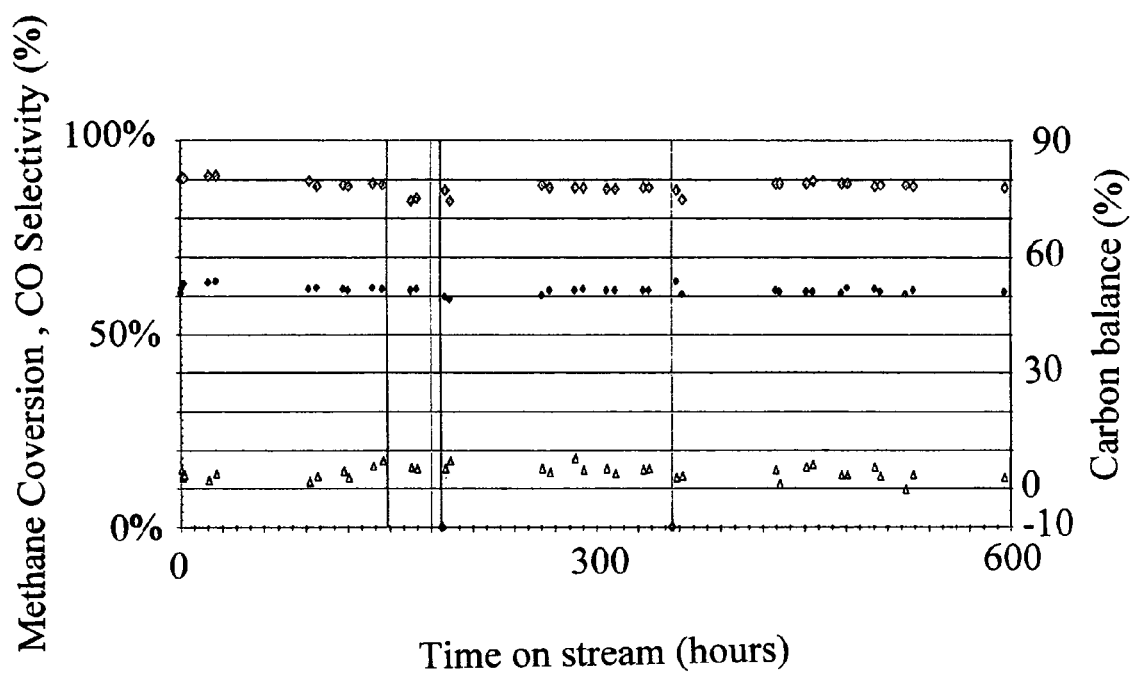
FIG. 4b shows steam reforming activity including methane conversion ($\diamond$), CO selectivity ($\blacklozenge$), and carbon balance ($\Delta$) over 600 hours time on stream of a Rh/$La/Al_2O_3$ catalyst whose support was thermally treated at 1050° C. for 50 hours. The vertical lines indicate system upsets during testing.

The FeCrAlY fins were used as support substrate for washcoat materials. After heat-treatment of the fins to form a surface oxide, they were coated with a layer of Dispal 14N4-25 alumina sol obtained from SASOL and a layer of doping solution. The synthesis method has been described earlier. Steam methane reforming (SMR) reaction tests were carried out on fresh, hydrothermally-treated and thermally-treated catalysts at 15 atm, 850° C., S/C=3/1, CT=4.5 ms. A fresh (not preaged) Rh/La/Al$_2$O$_3$ catalyst (25 mg/in$^2$) tested over 750 hours of life testing, showed steady methane conversion and carbon monoxide selectivity for approximately 250 hours; however, activity of the catalyst showed a continual decline over the next 500 hours. FIG. 4a shows activity of catalyst whose support has been hydrothermally treated at 1 atm. The support (La/Al$_2$O$_3$) was pre-treated under steam and nitrogen mixture at 2 to 1 ratio at near ambient pressure (about 0.7 atm H$_2$O) and heated (at a ramp up rate of 3.5° C./min) to 950° C., 15 atm, and held at these conditions for 100 hours. Then, the support was cooled at about 3.5° C./min. The total loading of the catalyst was 30.3 mg/in$^2$. Over 500 hours on stream, methane conversion fell by 6%. FIG. 4b shows the SMR activity over Rh/La/Al$_2$O$_3$ catalyst whose support was thermally treated (at a ramp up rate of 3.5° C./min) to 1050° C. and held at 1050° C. for 50 hours. Then the support was cooled at about 3.5° C./min. The total catalyst loading was 31.4 mg/in$^2$. Over 600 hours on stream at the same conditions, the activity of the catalyst decreased by less than 3% and did not experience the deactivation that was observed in fresh or hydrothermally treated (at ambient pressure) catalysts. This catalyst also survived system upsets (inadvertent shut downs and start ups) without any loss of catalyst performance.

A slurry of an La-doped alumina was coated onto a metal foil and tested for 850 hours at 12 atm, 825° C., S/C=2/1, CT=9 ms, showed a drop in methane conversion from 60% to 48% over the first 600 hours on stream. Thus, the catalysts prepared from a sol possess superior stability as compared with the slurry-derived catalyst.

Figure 5:
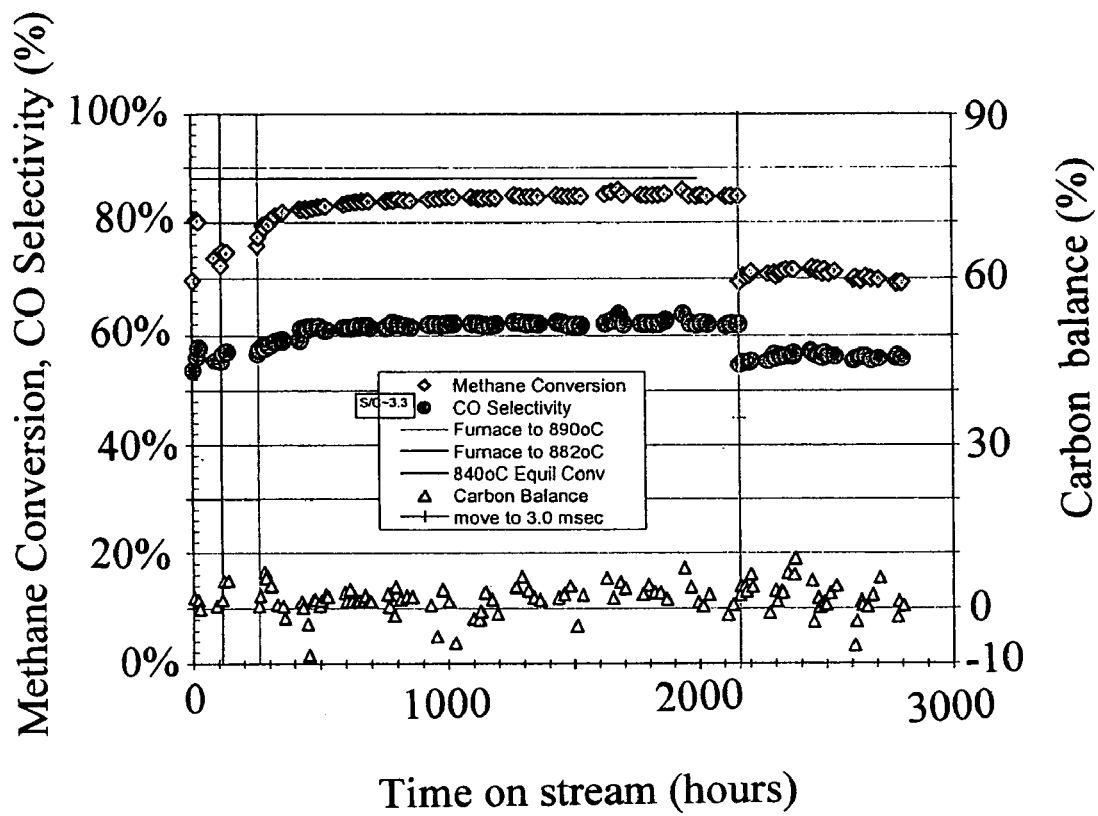
FIG. 5 shows the results including methane conversion ($\diamond$), CO selectivity ($\bullet$), and carbon balance ($\Delta$) of testing a catalyst of Rh/$MgAl_2O_4$ that was prepared by sol coating a finned substrate followed by steam pre-aging at 25 atm, 925° C. for 100 hours under $H_2O$/He=2/1. Methane steam reforming was conducted for 2800 hours of operation at 15 atm, 3 to 1 steam-to-carbon ratio, 4.5-3.0 ms contact time, and reactor wall temperature of 869° C. A step change in contact time (vertical line) was introduced at 2150 hours to move further away from the 840° C. equilibrium conversion.

FIG. 5 shows the results of testing a catalyst of Rh/MgAl$_2$O$_4$ whose support was prepared by sol coating a finned substrate followed by steam pre-aging at 25 atm, 925° C. for 100 hours under H$_2$O/He=2/1. The fin was then coated with Rh nitrate solution (1% Rh) and calcined at 950° C. for 1 hour. The metal loading was 13.6 mg/in$^2$ (9.4 wt % Rh oxide measured by weight gain after calcinations assuming all Rh in form of Rh$_2$O$_3$). Methane steam reforming was conducted for 2800 hours of operation at 15 atm, 3 to 1 steam-to-carbon ratio, 4.5-3.0 ms contact time, and reactor wall temperature of 869° C. A step change in contact time was introduced at 2150 hours to move further away from the 840° C. equilibrium conversion. There were no system upsets which contributed to a smooth operation for 2800 hours TOS. As can be seen, there was no change in activity for over 2000 hours of continuous operation. Notably, methane conversion remained at 70%+3% for at least 600 hours (between 2200 and 2800 hours) at a catalyst operating temperature of less than 900° C. and a contact time of 5 ms or less.

Figure 6:
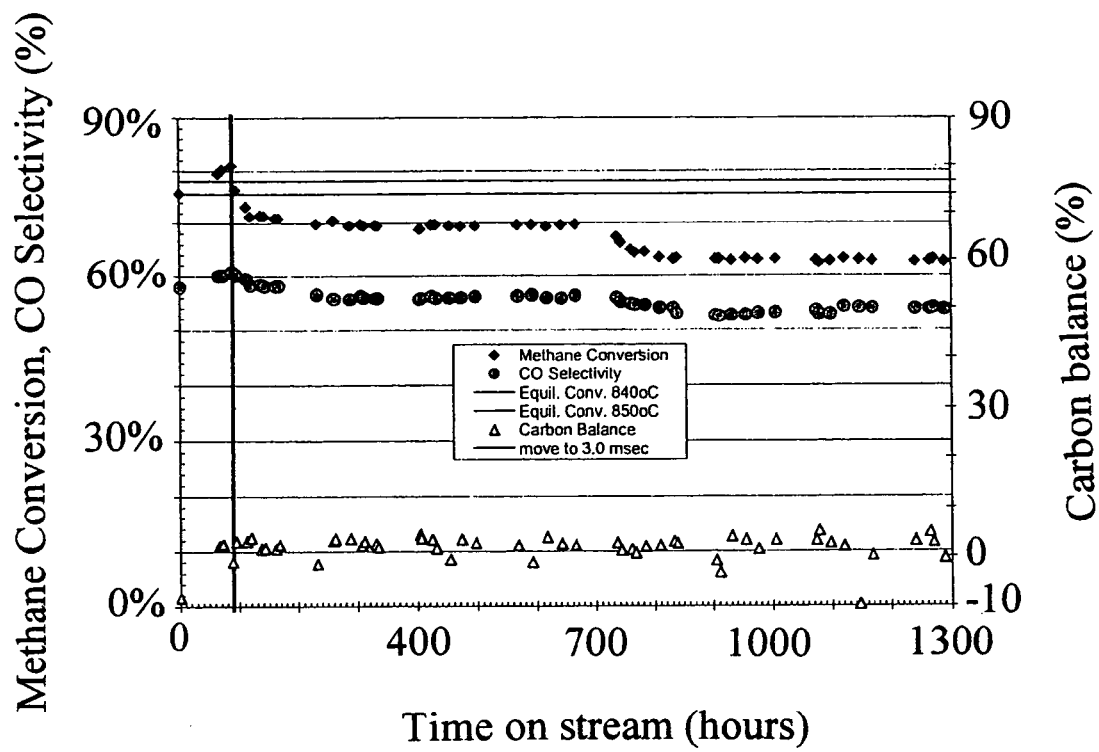
FIG. 6 shows the results including methane conversion ($\diamond$), CO selectivity ($\bullet$), and carbon balance ($\Delta$) of testing a catalyst of Rh/$MgAl_2O_4$ that was prepared by sol coating a finned substrate followed by steam pre-aging at 25 atm, 925° C. for 100 hours under $H_2O$/He=2/1. The metal loading was 20 mg/in$^2$ (25 wt % Rh oxide). Methane steam reforming was conducted at 27 atm, 3 to 1 steam-to-carbon ratio, 3.0-4.2 ms contact time, and reactor wall temperature of 870-873° C.

FIG. 6 shows the results of testing a catalyst of Rh/MgAl$_2$O$_4$ whose support was prepared by sol coating a finned substrate followed by steam pre-aging at 25 atm, 925° C. for 100 hours under H$_2$O/He=2/1. The metal loading was 20 mg/in$^2$ (25 wt % Rh oxide). Methane steam reforming was conducted at 27 atm, 3 to 1 steam-to-carbon ratio, 3.0-4.2 ms contact time, and reactor wall temperature of 870-873° C. At 650 hours time-on-stream (TOS), the steam to carbon ratio dropped due to a water pump malfunction and resulted in a loss of activity; however, after conditions were restored, the catalyst reached another steady-state level at 64%. Thus, two periods of at least 400 hours of steady state operation were observed; one at 70% conversion and one at 64% conversion. In FIG. 6, the horizontal lines at 76 and 78% are equilibrium conversions at 840 and 850° C., respectively. The vertical line at 90 hours indicates the change to 3 ms contact time.

Performance of Thermal Pre-aged Catalyst

Figure 7:
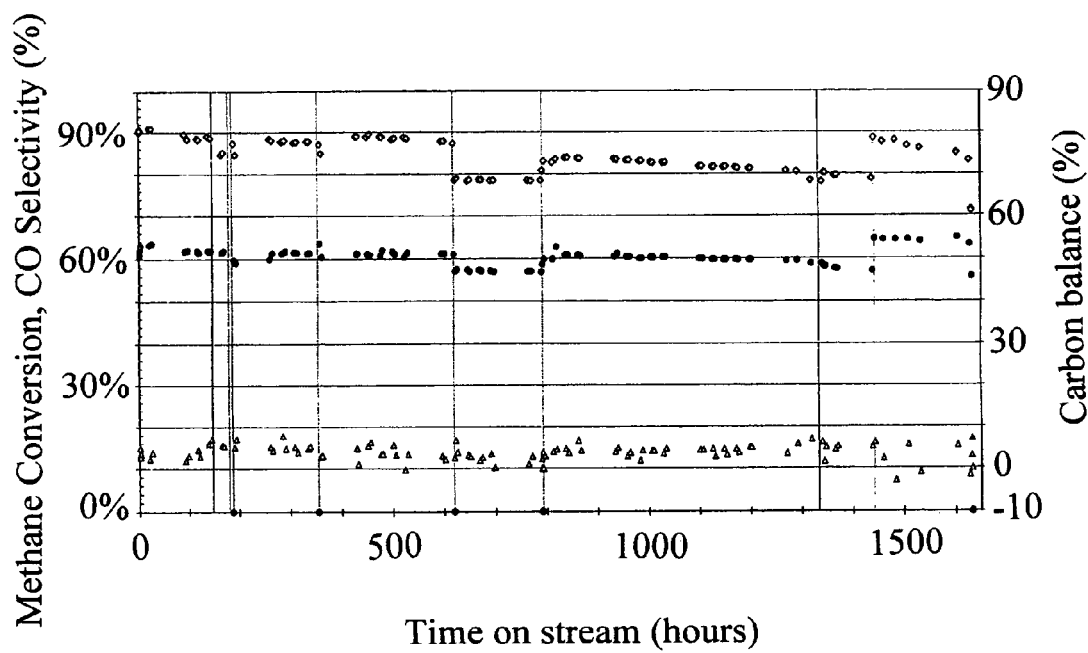
FIG. 7 shows the results including methane conversion ($\diamond$), CO selectivity ($\blacklozenge$), and carbon balance ($\Delta$) of testing a catalyst of Rh/$MgAl_2O_4$ that was prepared by sol coating a finned substrate followed by thermal pre-aging at 1050° C. for 50 hours. Methane steam reforming was conducted at 15 atm, 3 to 1 steam-to-carbon ratio, 3.0-4.5 ms contact time, and reactor wall temperature of about 840 to 950° C.

FIG. 7 shows the results of testing a catalyst of Rh/MgAl$_2$O$_4$ whose support was prepared by sol coating a finned substrate followed by thermal pre-aging at 1050° C. for 50 hours in air. The metal loading was 31 mg/in$^2$ (20 wt % Rh oxide) (a thicker coating than the last example). Methane steam reforming was conducted at 15 atm, 3 to 1 steam-to-carbon ratio, 3.0-4.5 ms contact time, and reactor wall temperature of about 840° C. In FIG. 7, the two vertical lines at about 100 hours and the vertical line at about 350 hours indicate system upsets. After demonstrating a steady methane conversion at 88% for 600 hours, the conditions were changed to reflect a kinetically controlled regime by lowering the contact time to 3.0 ms at 625 hours TOS without compensating for the drop in temperature due to the higher flow rate used. The activity was steady for ~200 hours. At 800 hrs on stream, furnace temperature was increased by 20° C. (while maintaining the 3 ms contact time) to match the temperature of the reactor at 4.5 ms contact time, and over the next 500 hours, the catalyst steadily deactivated, dropping from 84% conversion to 78% conversion. After 1300 hours, the conditions were changed back to the initial conditions (875° C., 4 ms) and it was found that the methane conversion level had dropped from 88% to 80%. In order to recover the initial conversion level of methane (~88%), it was necessary to raise the furnace temperature by 55° C.

Performance of Non-aged Catalyst

Figure 8:
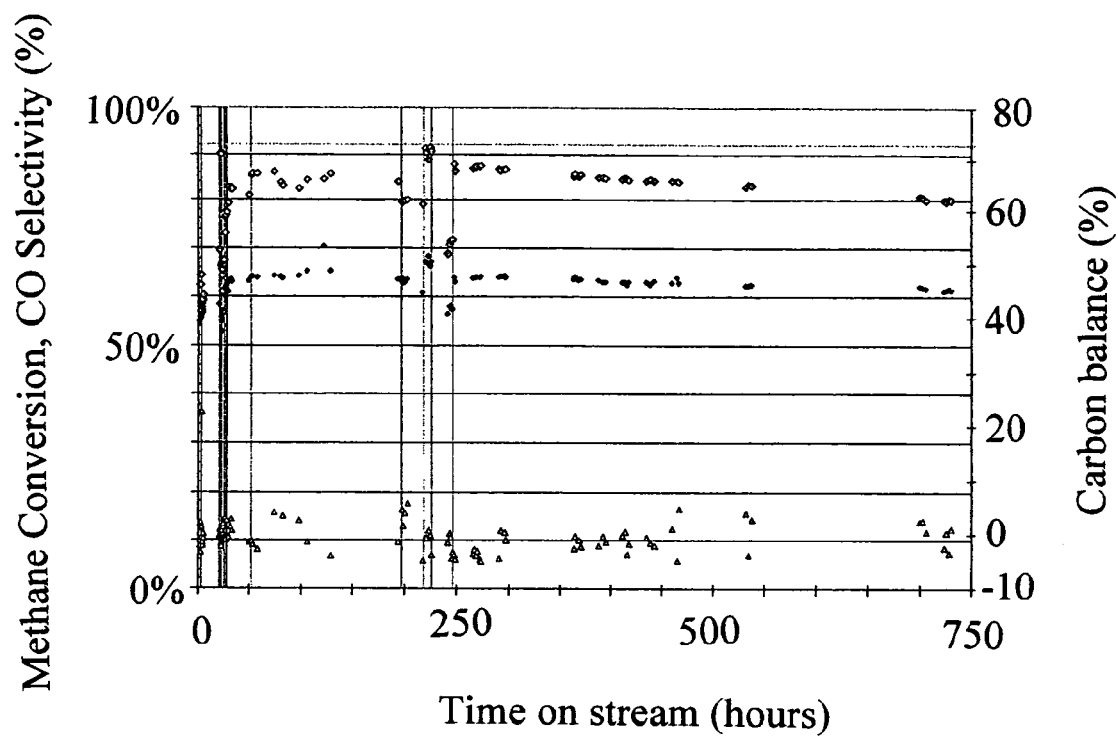
FIG. 8 illustrates testing results including methane conversion ($\diamond$), CO selectivity ($\blacklozenge$), and carbon balance ($\Delta$) of a Rh/$MgAl_2O_4$ catalyst that was prepared by sol coating a finned substrate, and without thermal or hydrothermal pretreatment of the support.

FIG. 8 shows the results of testing a catalyst of Rh/LaAl$_2$O$_4$ whose support was prepared by sol coating a finned substrate followed by drying. The metal loading was 25 mg/in$^2$ Methane steam reforming was conducted for 750 hours. Up to 250 hours, conditions were changed several times (vertical lines) at 850 or 875° C. and contact times between 2.5 and 6 ms with one system shut down at 25 hours. At 250 hours, conditions were set to 15 atm, 3 to 1 steam-to-carbon ratio, 4.5 ms contact time, and catalyst reactor wall temperature of about 875° C. By 750 hours TOS, methane conversion dropped 8%, probably due to a phase change of γ-Al$_2$O$_3$ to α-Al$_2$O$_3$ under the reaction conditions, which in turn reduced the surface area significantly, thus, encapsulating some of Rh sites.

Effect of Reduction Temperature

Figure 9:
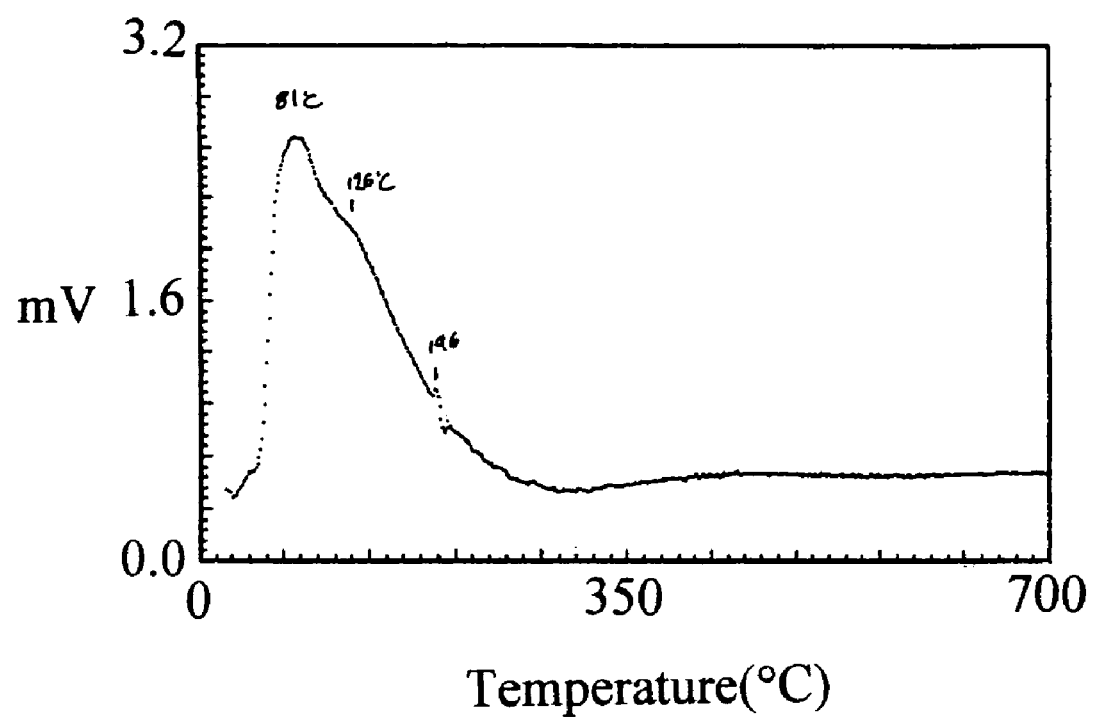
FIG. 9 shows a plot representing $H_2$ consumption as a function of temperature on fresh Rh/$MgAl_2O_4$ catalyst that was oxidized 500° C.

The temperature range over which Rh/MgO—Al$_2$O$_3$ catalysts (fresh and thermally stabilized) was reduced was studied using temperature-programmed reduction (TPR) technique with 5% H$_2$ in Ar. FIG. 9 presents a plot of H$_2$ consumption as a function of temperature on the fresh catalyst that was oxidized 500° C. There is a broad peak starting at 70° C. and tailing off to a baseline at about 280° C. with multiple shoulders, indicating hydrogen adsorption/absorption on the surface and the bulk of the metal. The plot reveals that most of catalyst reduction is completed at 200° C. Similar results were obtained on the pre-stabilized catalyst.

Metal dispersion of the fresh and pre-stabilized (PS) SMR catalysts reduced at 125° C. and 300° C. were measured using hydrogen chemisorption technique and presented in Table 4.

TABLE 4

Variation on dispersion % on catalysts supported on fresh and pre-stabilized spinel with function of reduction temperature

| Reduction T (° C.) | 10% Rh on fresh spinel | 5% Rh on PS spinel |
|---|---|---|
| 125 | 17.0 | 15.8 |
| 300 | 24.0 | 15.9 |

On 10% Rh on fresh spinel, the dispersion increased by 7% while on the pre-stabilized support, there was only a small improvement observed. This could be explained by the significant difference in specific surface areas of the two supports (158 m²/g (fresh) vs 10 m²/g (pre-stabilized)).

Figure 10:
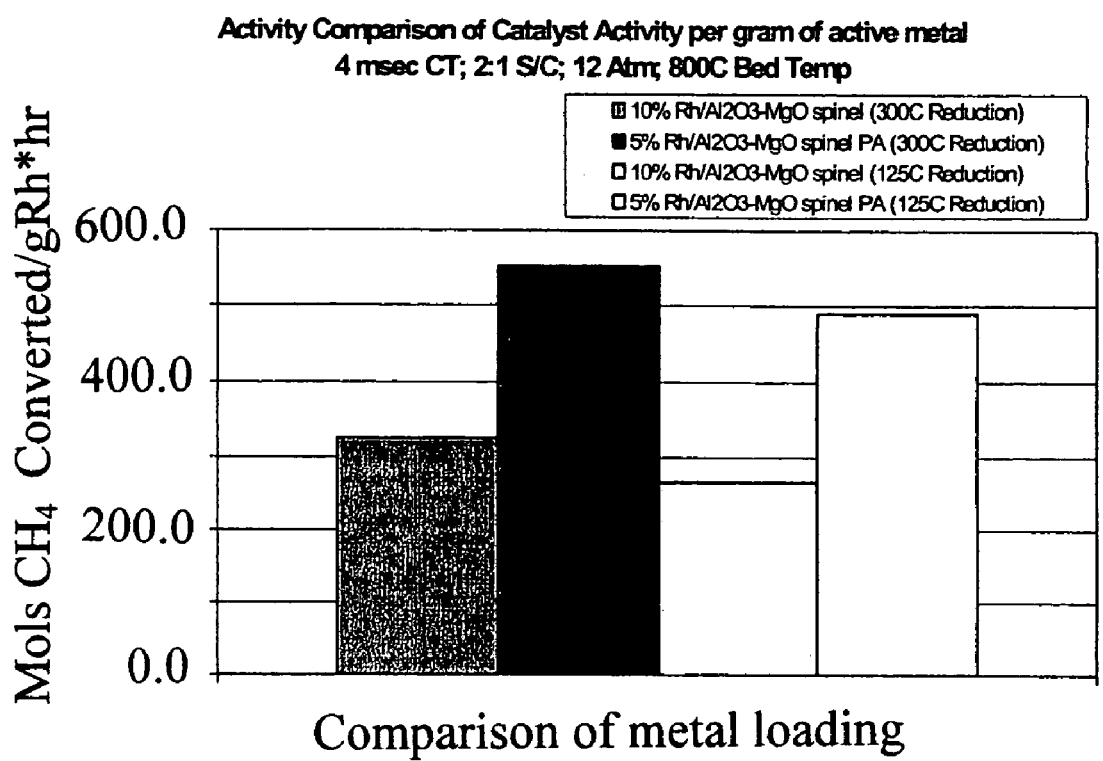
FIG. 10 illustrates the SMR activity of certain powder catalysts measured as a function of reduction temperature.

The activity of the powder catalysts, which were diluted with alpha alumina by 20 wt %, were measured as a function of reduction temperature as shown in FIG. 10. Both catalysts (10% Rh/fresh spinel and 5% Rh/pre-stabilized spinel) showed an improvement in catalyst activity when they were reduced at 300° C. rather than 125° C. The relative increase in methane conversion rate for fresh and pre-stabilized powder catalysts were 22% and 13%, respectively.

Particle Size

On supports made of a hydrothermally-treated magnesia-stabilized alumina support having a surface area about 10 m²/g, Rh nitrate solution was added using the incipient wetness technique. The Rh was reduced at 300° C. Hydrogen chemisorption experiments showed the metal dispersion (i.e., the percent of the total metal that is exposed on the surface) of 1% Rh, 5% Rh, and 10% Rh on the pre-aged support to be 23%, 15%, and 10%, respectively. Transmission Electron Microscopic analysis of the catalysts showed that the Rh particles on the 10% Rh/spinel catalyst were about 1.5 nm in size. The Rh particle size on the 5% Rh/preaged spinel catalyst ranged from 1.4 to 4.0 nm with an average particle size of about 2.7 nm.

Catalyst Activity and Productivity

Catalyst activity and productivity were compared against the best prior art literature (Wang et al., US published patent application 2003/00317105). The approach temperature difference for the catalyst and the gram moles of methane fed per gram catalytically active material (in preferred embodiments, per gram Rh) per minute can be compared to the upper and lower limits of the operating space described by the function below:

$$1° C. \times N < \Delta T_{approach} < 50° C. \times N$$

where N is the gram moles of methane fed per minute per gram catalytically active material (in preferred embodiments, per gram Rh). For example, the values of N and $\Delta T_{approach}$ were calculated for one condition of this study as follows: 0.122 SLPM (or 0.00545 mol/min) of methane was fed with steam at a molar ratio of 3:1 steam to carbon to an engineered catalyst loaded with 0.00024 grams Rh catalyst. Thus, for this example, N=(0.00545 mol CH$_4$/min)/(0.00024 g Rh)=23 mol CH$_4$/min/g Rh. The average of the measured inlet and outlet pressure across the engineered catalyst at the time the data was taken was about 198 psig (14.7 bar). The calculated peak catalyst bed temperature at this same condition was 856° C. The measured methane conversion at this condition (feeding 3:1 steam to carbon at 14.7 bar and 891° C. at 23 mol CH$_4$/min/g Rh) was 85.3%. Using the NASA Lewis equilibrium code to calculate gas phase equilibrium for a 3:1 steam to carbon mixture at 14.7 bar, it is found that the equilibrium methane conversion to CO and CO$_2$ is 85.3% at 825° C. In other words, chemical equilibrium of a 3:1 steam:C mixture at 14.7 bar and 825° C. represents a conversion of 85.3% of the methane in the original mixture to carbon monoxide and carbon dioxide. Therefore the $\Delta T_{approach}$ for this example is 856° C.−825° C.=31° C.

The "approach temperature difference" ($\Delta T_{approach}$) is the difference between the "peak catalyst bed temperature" (as defined in the Summary section for methods of steam reforming) and the "apparent equilibrium conversion temperature". The difference is a measure of catalyst performance, with the difference increasing as the chemical reaction kinetics of a given catalyst become slow enough that the equilibrium composition is not reached at the average measured reaction temperature.

The "apparent equilibrium conversion temperature" is the apparent temperature based upon the conversion of the reactant in question. It is the temperature required to produce an equilibrium composition equivalent in reactant conversion to the measured experimental conversion. The equilibrium composition is based upon the measured average pressure of the inlet and outlet of the reactor zone and the inlet molar composition. It is helpful to obtain a curve of equilibrium conversion versus temperature to find the apparent equilibrium conversion temperature. The equilibrium distribution (or composition) for a given temperature, pressure, and inlet mole fraction distribution can be calculated using Gibbs free energies with programs such as the NASALEWIS equilibrium code or FACTSAGE. The fractional conversion of a reactant is the difference between the molar flow rate into and the molar flow rate out of the reactor zone divided by the flow rate into the reactor zone as shown below.

Fractional conversion=(moles methane in−moles methane out)/(moles methane in)

Moles methane in=inlet flowrate of methane at STP/(22.4 L/mol)

Figure 11:
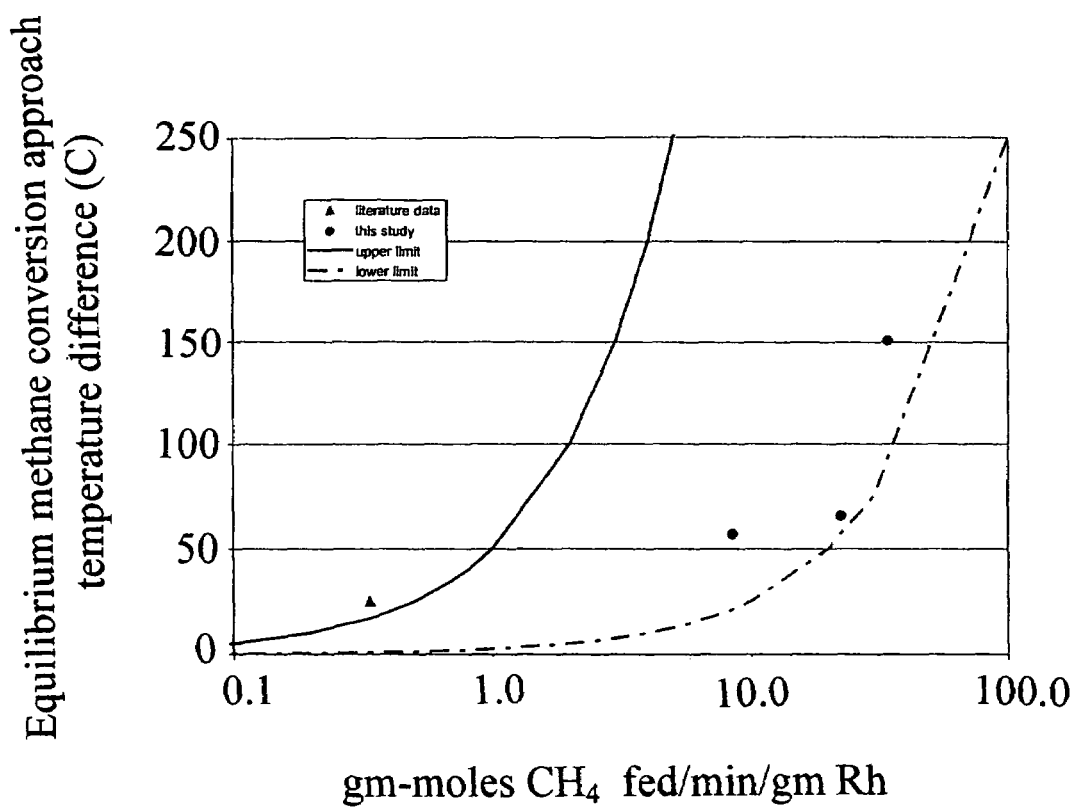
FIG. 11 is a plot of feed rate per gram Rh (N) versus equilibrium methane conversion approach temperature difference ($\Delta T_{approach}$).

Moles methane out=[outlet flowrate of total product dry gas/(22.4 L/mol)]×% methane in dry gas GC analysis The data plotted in FIG. 11 shows lines corresponding to the bounds set forth in equation 1.1 as well as data points from this work (●) and the literature (♦). Some preferred embodiments of the invention can be defined by the $\Delta T_{approach}$ in the expression: 1° C.×N<$\Delta T_{approach}$<15° C.×N, more preferably 1° C.×N<$\Delta T_{approach}$<5° C.×N and in some embodiments by the expression: 1.5° C.×N<$\Delta T_{approach}$<15° C.×N

We claim:

1. A method of methane steam reforming, comprising: conducting a reaction in which methane and steam contact a catalyst at a temperature of at least 800° C. for at least 2000 hours without regenerating the catalyst; wherein the catalyst comprises a stabilized alumina support and a catalytically active material; and wherein the method is further characterized by a contact time of 5 ms or less while the conversion of methane is at least 85% of the equilibrium conversion, and where the conversion has diminished by less than 3% over the 2000 hours without regenerating the catalyst; and further wherein N is greater than 1.0; wherein N is the gram moles of methane fed per minute per gram of catalytically active material.

2. The method of claim 1 wherein the temperature during the at least 2000 hours, the temperature is at least 850° C. and the partial pressure of H$_2$O is at least 5 atm.

3. The method of claim 2 wherein the steam to carbon ratio is 3 or less.

4. The method of claim 2 wherein averaged over the at least 2000 hours
the method has a $\Delta T_{approach}$ in the range $$1° C. \times N < \Delta T_{approach} < 25° C. \times N$$

wherein $\Delta T_{approach}$ is the difference between the peak catalyst bed temperature and the apparent equilibrium conversion temperature; wherein the peak catalyst bed temperature is the highest temperature in the catalyst.

5. The method of claim 4 wherein a stream containing the methane and steam is passed into a reaction microchannel containing the catalyst.

6. The method of claim 1 wherein the catalyst temperature is 1000° C. or less.

7. The method of claim 4 wherein, averaged over the at least 2000 hours the method has a $\Delta T_{approach}$ in the range $$1.5° C. \times N < \Delta T_{approach} < 15° C. \times N.$$

8. The method of claim 3 wherein heat is transferred into the catalyst from a microchannel heat exchanger that is adjacent to the reaction microchannel.

9. A method of methane steam reforming, comprising:
passing a stream comprising methane and water in a steam to carbon ratio of 3 or less, contacting said stream with a catalyst at a contact time of 5 ms or less and maintaining the same conditions for at least 1000 hours, wherein there is a continuous period of at least 595 hours in which the methane conversion changes by 3% or less; wherein the conversion of methane is at least 85% of the equilibrium conversion; and wherein at least 2 mol of methane are converted per gram catalytically-active material each minute.

10. The method of claim 9 wherein the catalyst comprises Rh and at least 2 mol of methane are converted per gram Rh each minute.

11. The method of claim 9 wherein the stream is passed into a reaction microchannel containing the catalyst.

12. The method of claim 11 wherein heat is transferred into the catalyst from a microchannel heat exchanger that is adjacent to the reaction microchannel.

13. The method of claim 10 wherein $1° C. \times N < \Delta T_{approach} < 25° C. \times N$ over the at least 595 hours, and the conversion of methane is at least 90% of the equilibrium conversion;
wherein N is the gram moles of methane fed per minute per gram of catalytically active material; and wherein $\Delta T_{approach}$ is the difference between the peak catalyst bed temperature and the apparent equilibrium conversion temperature; wherein the peak catalyst bed temperature is the highest temperature in the catalyst.

14. The method of claim 10 wherein $1° C. \times N < \Delta T_{approach} < 5° C. \times N$ over the at least 595 hours;
wherein N is the gram moles of methane fed per minute per gram of catalytically active material; and wherein $\Delta T_{approach}$ is the difference between the peak catalyst bed temperature and the apparent equilibrium conversion temperature; wherein the peak catalyst bed temperature is the highest temperature in the catalyst.

15. The method of claim 5 wherein $1° C. \times N < \Delta T_{approach} < 5° C. \times N$ over the at least 2000 hours;
wherein N is the gram moles of methane fed per minute per gram of catalytically active material; and wherein $\Delta_{approach}$ is the difference between the peak catalyst bed temperature and the apparent equilibrium conversion temperature; wherein the peak catalyst bed temperature is the highest temperature in the catalyst.

16. The method of claim 2 wherein the catalyst comprises Rh and at least 2 mol of methane are converted per gram Rh each minute.

17. The method of claim 1 wherein the methane and steam flow into contact with the catalyst in a steam to carbon ratio of 3:1 to 1:1.

18. The method of claim 17 wherein the stabilized alumina support is stabilized with Mg.

19. A method of methane steam reforming, comprising:
conducting a reaction in which methane and steam contact a catalyst at a temperature of at least 800° C. for at least 1000 hours without regenerating the catalyst;
wherein the catalyst comprises a stabilized alumina support and a catalytically active material; and wherein the method is further characterized by a contact time of 5 ms or less while achieving an average approach to equilibrium conversion of greater than 90% and further wherein the conversion has diminished by less than 3% over the 1000 hours without regenerating the catalyst; and further wherein N is greater than 1.0;
wherein the average approach to equilibrium conversion is the ratio of measurable hydrocarbon conversion to equilibrium hydrocarbon conversion; wherein N is the gram moles of methane fed per minute per gram of catalytically active material.

20. The method of claim 19 wherein the catalyst comprises Rh.

21. The method of claim 18 wherein the catalyst comprises 1 to 3 wt % Rh.

22. The method of claim 1 wherein the methane and steam contact the catalyst at a temperature of less than 900° C.

23. The method of claim 1 characterized by a contact time of 5 ms or less while achieving an average approach to equilibrium conversion of greater than 90%.

24. The method of claim 23 wherein the catalyst comprises Rh.

25. The method of claim 1 wherein the partial pressure of steam is at least 2 atm.

26. The method of claim 9 wherein after the 595 hours of continuous operation, the CO selectivity is essentially unchanged.

27. The method of claim 1 wherein the method is conducted at a pressure of from 10 atm to 30 atm.

28. The method of claim 1 wherein a stream containing the methane and steam is passed into a reaction microchannel containing the catalyst.

* * * * *